US006631219B2

(12) United States Patent
Yushiya et al.

(10) Patent No.: US 6,631,219 B2
(45) Date of Patent: Oct. 7, 2003

(54) IMAGE READING SYSTEM

(75) Inventors: Akihiko Yushiya, Tokyo (JP); Eiichi Takami, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/043,333

(22) Filed: Jan. 14, 2002

(65) Prior Publication Data

US 2002/0057469 A1 May 16, 2002

Related U.S. Application Data

(62) Division of application No. 08/869,480, filed on Jun. 5, 1997, now Pat. No. 6,456,748.

(30) Foreign Application Priority Data

Jun. 6, 1996 (JP) .............................. 8-144488
May 15, 1997 (JP) .............................. 9-125523

(51) Int. Cl.[7] .............................................. G06K 9/20
(52) U.S. Cl. .................................................. 382/312
(58) Field of Search ................................ 382/312, 317, 382/318, 319, 321, 323, 324; 250/205, 238; 235/455; 315/117; 355/37, 69; 348/210.99

(56) References Cited

U.S. PATENT DOCUMENTS

| 4,384,272 A | 5/1983 | Tanaka et al. ............... 382/321 |
| 4,408,231 A | 10/1983 | Rushaw et al. ............. 382/312 |
| 4,700,061 A | 10/1987 | Ishikawa .................... 382/321 |
| 4,748,680 A | 5/1988 | Margolin .................... 382/321 |
| 4,760,609 A | 7/1988 | Tamagaki ................... 382/321 |
| 4,845,770 A | 7/1989 | Koshida ..................... 382/321 |
| 5,245,671 A | 9/1993 | Kobayashi et al. .......... 382/321 |
| 5,295,196 A | 3/1994 | Raterman et al. ........... 382/321 |
| 5,783,820 A | 7/1998 | Takami ....................... 250/239 |
| 5,883,987 A | 3/1999 | Ogoshi et al. .............. 382/321 |
| 5,898,510 A | 4/1999 | Kaihotsu et al. ............ 358/509 |
| 6,320,681 B1 | 11/2001 | Yushiya ...................... 358/509 |

FOREIGN PATENT DOCUMENTS

| JP | A-61-148959 | 7/1986 |
| JP | A-03-295353 | 12/1991 |
| JP | B-04-11065 | 1/1992 |
| JP | A-04-183062 | 6/1992 |

*Primary Examiner*—Jose L. Couso
(74) *Attorney, Agent, or Firm*—Fitzpatrick, Cella, Harper & Scinto

(57) ABSTRACT

In case of reading a black-and-white original, the LEDs of R (red), G (green) and B (blue) colors are maintained at turn-on duty ratios same as those at the color image reading, and are turned on simultaneously or in succession, with the turn-on period reduced to ⅓, whereby the forward current of each of the R, G, and B LEDs is maintained same in the color image reading mode and in the black-and-white image reading mode. Thus, in case of reading the black-and-white original with the light source-switched color image sensor, the current adjusting means for adapting to such reading modes can be dispensed with in the light emitting elements for illuminating the original image, and the service life of the device can be extended with the simple configuration.

26 Claims, 30 Drawing Sheets

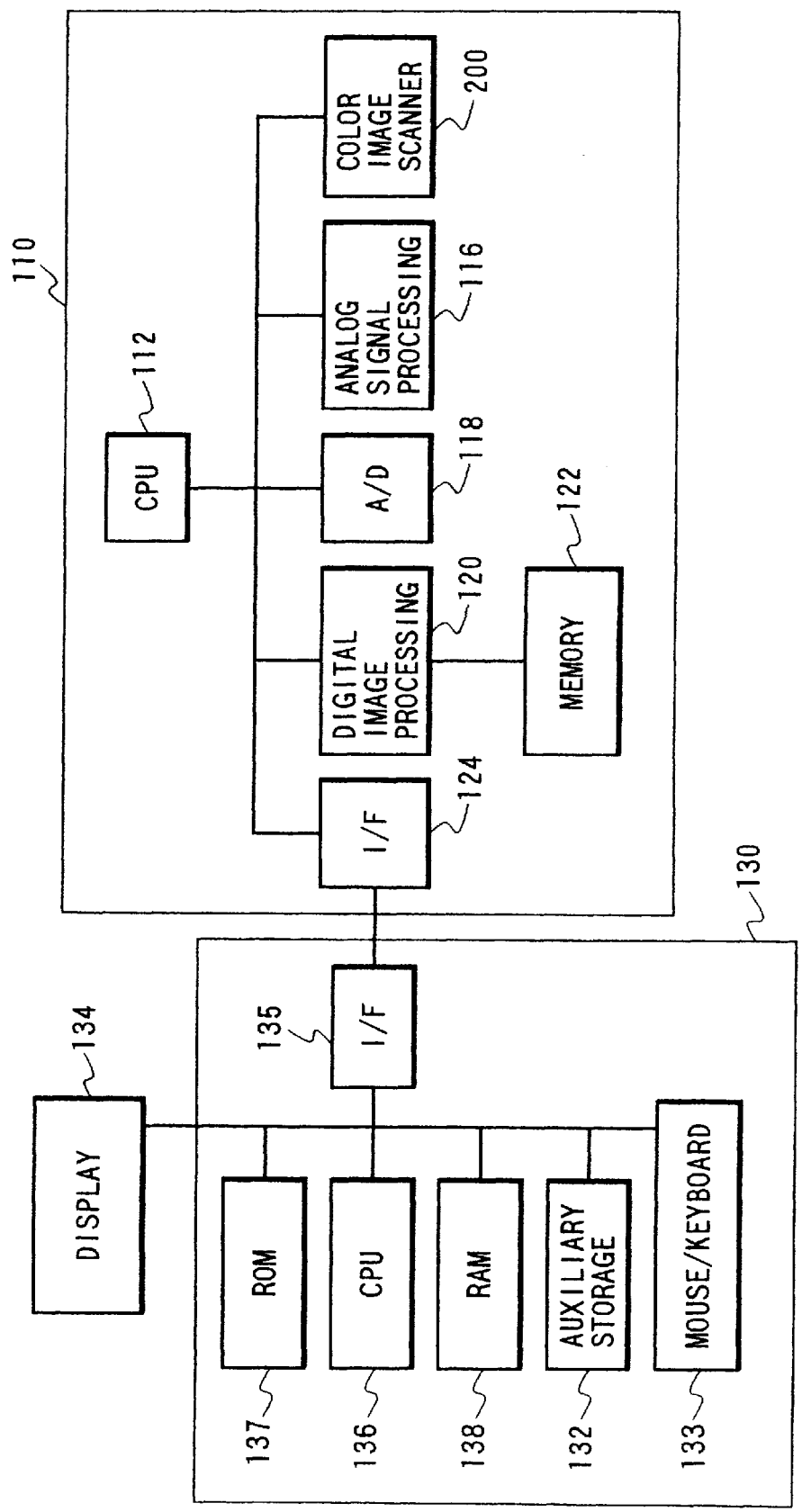

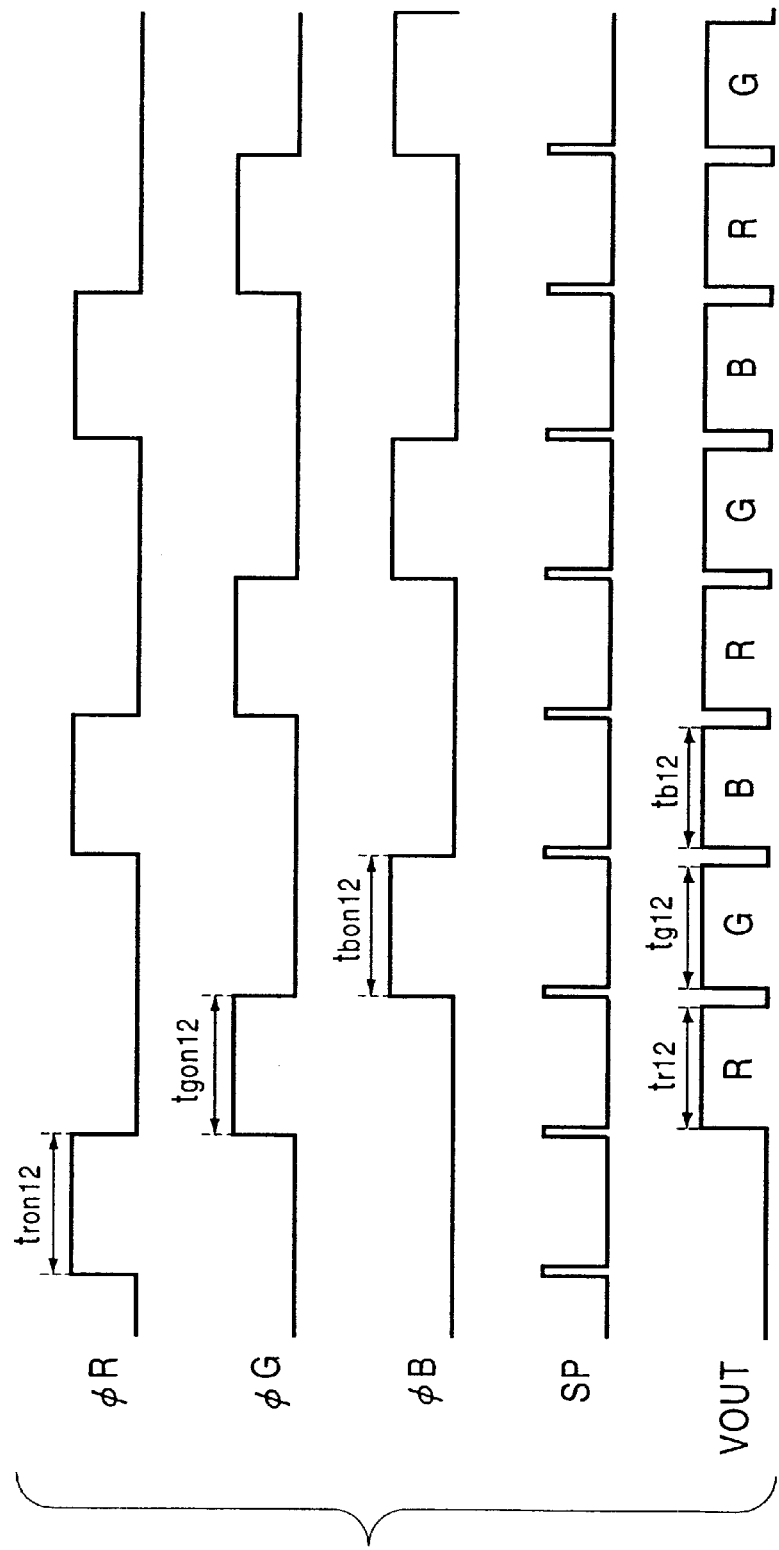

IMAGE READING SYSTEM

This application is a division of application Ser. No. 08/869,480, filed Jun. 5, 1997, now U.S. Pat. No. 6,456,748.

BACKGROUND OF THE INVENTION

1. Field of the Invention

The present invention relates to an image reading system capable of black-and-white and color image reading in two modes, and adapted for use in a facsimile or a scanner.

2. Related Background Art

For reading a color original, there is already known a color image sensor with light source switching, in which light emitting diodes (LED) are provided for emitting lights of three primary colors of R(red), G(green) and B(blue) and a signal is obtained from a photosensor by irradiating each position of the original with each of the R, G and B lights whereby a color signal is obtained corresponding to the color original.

The drive of such light source-switched color image sensor is controlled by an image sensor driving circuit 101 as shown in FIG. 35, wherein provided are a light source-switched color image sensor unit 200, a main controller 102 for controlling the drive thereof, a control signal generating circuit 103 for generating control signals XSH, MCLK in response to a control signal CNT from the main controller 102, an LED control unit 104 for generating signals, ΦR, ΦG, ΦB for controlling the turning-on of the R, G, B LEDs in response to the control signals CNT and XSH, and a sensor array control unit 105 for generating signals SP, CLK for controlling the drive of a sensor array in response to the control signal XSH, MCLK.

In such image sensor driving circuit, the main controller 102 sends the control signal CNT matching the reading mode to the control signal generation circuit 103 and the LED control circuit 104, thereby controlling the turning-on of the R, G and B LEDs and driving the sensor array according to the reading mode.

In the color original reading mode, the image sensor drive circuit 101 supplies the light source-switched image sensor unit 200 with the control signals ΦR, ΦG, ΦB, SP and CLK as shown in FIG. 36, to effect the image reading in the following manner.

At first the signal ΦR turns on the R LED only, and the sensor array is activated by the start pulse SP and the clock pulse CLK to accumulate R signals in the pixels of the sensor array. After the lapse of an R signal accumulation time $t_{ron12}$, the R LED are turned off by the signal ΦR. Then the G LED are turned on by the signal ΦG and the start pulse SP is entered again, whereupon the R signals already accumulated in the pixels of the sensor array are simultaneously transferred to analog memories on the sensor array and then are output to the exterior pixel by pixel.

After the same time, G signals are accumulated in the pixels of the sensor array. After the lapse of a G signal accumulation time $t_{gon12}$, the G LED are turned off by the signal ΦG. Then B LED are turned on by the signal ΦB and the start pulse SP is entered again, whereby the G signals already accumulated in the pixels of the sensor array are simultaneously transferred to analog memories on the sensor array and then are output to the exterior pixel by pixel.

At the same time, B signals are accumulated in the pixels of the sensor array. After the lapse of a B signal accumulation time $t_{bon12}$, the B LED are turned off by the signal ΦB. Then the R LED are turned on by the signal ΦR and the start pulse SP is entered again, whereby the B signals already accumulated in the pixels of the sensor array are simultaneously transferred to analog memories on the sensor array and then are output to the exterior pixel by pixel.

In this state the image sensor unit 200 has been moved to a next reading line, and similar operation are repeated for obtaining R, G and B signals. The entire color image is read by repeating the above-explained sequence by moving the image sensor unit 200 line by line in the subscanning direction.

In FIG. 36, the turn-on time $t_{ron12}$, $t_{gon12}$, $t_{bon12}$ of the R, G, B LED and the output periods $t_{r12}$, $t_{g12}$, $t_{b12}$ of the R, G, B sensors are selected as $t_{ron12}=t_{gon12}=t_{bon12}=t_{r12}=t_{g12}=t_{b12}$. This is achieved by adjusting the forward currents of the R, G, B LED of the color image sensor units in such a manner that predetermined sensor output levels are obtained for the R, G and B signals for an LED turn-on time same as the sensor output time for outputting the signals of all pixels.

Then, in the black-and-white original reading mode, the image sensor drive circuit 101 supplies the light source-switched image sensor unit 200 with the control signals ΦR, ΦG, ΦB, SP and CLK as shown in FIG. 37, wherein the turn-on time $t_{ron13}$, $t_{gon13}$, $t_{bon13}$ of the R, G, B LED and the black-and-white output period $t_{w13}$ are selected as $t_{ron13}$, $t_{gon13}=t_{bon13}=t_{w13}$ and $t_{ron\ 13} \neq t_{ron12}$. In this mode, the turn-on duty ratio of the LED is different from that in the color image reading because the R, G and B LED are simultaneously turned on for reading each line. Also in case of color image reading, the illuminating light intensity is so adjusted as to provide a predetermined sensor output when only one of the R, G and B LED is turned on. Because of these facts, the forward currents and the turn-on times of the R, G, B LEDs in reading the black-and-white original have to be made different from those in the color image reading mode.

The reading of the black-and-white original is executed in the following manner with the control signals shown in FIG. 37. At first all the LEDs of R, G and B colors are simultaneously turned on by the signals ΦR, ΦG, ΦB, and the sensor array is activated by the start pulse SP and the clock pulse CLK, whereby W signals corresponding to the black-and-white image are accumulated in the pixels of the sensor array. After the image reading of a line of the original, the image sensor unit 200 is moved to a next reading line and the start pulse SP is entered again, whereby the W signals already accumulated in the pixels of the sensor array are simultaneously transferred to the analog memories of the sensor array and then are output to the exterior in succession.

In this state, all the LEDs of R, G and B colors are turned on, whereby W signals of the next reading line are accumulated in the pixels of the sensor array. After the image reading of this line of the original, the image sensor unit 200 is moved to a further next reading line and the start pulse SP is entered again, whereby the W signal already accumulated in the pixels of the sensor array are simultaneously transferred to the analog memories of the sensor array and then are output to the exterior in succession. The black-and-white reading of the entire original is executed by repeating the above-explained sequence, with successive movement of the image sensor unit 200 by a line in the sub scanning direction.

As explained in the foregoing, such conventional light source-switched color image sensor can not only read the color image by illuminating each reading line of the original by turning on the R, G and B LEDs in succession and obtaining the output of the line sensor, but also read the black-and-white image by simultaneously turning on such R, G and B LEDs and obtaining the output of the line sensor.

However, in case of the black-and-white image reading, since the R, G and B LEDs are simultaneously and continuously turned on, the system may become unreliable if these LEDs are turned on under the same conditions as those in the color image reading. For this reason, the reliability of the system is maintained for example by reducing the currents supplied to the LEDs at the black-and-white image reading in comparison with those in case of the color image reading, but such operation complicates the LED driving circuit and the signal processing circuit, thereby elevating the costs thereof.

SUMMARY OF THE INVENTION

An object of the present invention is to provide an image reading system capable of color image reading and monochromatic image reading of high image quality, with a simple configuration.

Another object of the present invention is to provide a light source control device enabling image reading with an appropriate light amount.

Still another object of the present invention is to prevent deterioration of the light source employed in the image reading, to prevent the lowering in the illumination intensity of the light source, and to extend the service life of the light source.

The above-mentioned objects can be attained, according to an embodiment of the present invention, by an image reading system comprising plural light sources of mutually different light emission wavelengths, reading means for reading the image illuminated by the plural light sources, thereby outputting image signals, and control means for effecting control, in causing the reading means to effect monochromatic image reading by turning on the plural light sources in succession, in such a manner that the turn-on period of at least one of the plural light sources becomes shorter than that in the color image reading.

There is also provided a light source control device for controlling the light sources to be used in an image reading device, comprising plural light sources of mutually different light emission wavelengths, and control means for effecting control, in case of monochromatic image reading by the image reading device, in such a manner that the plural light sources are turned on in succession, and that the turn-on period of at least one of the plural light sources becomes shorter than that in the color image reading.

Also there is provided a memory medium storing a program for effecting control, in case of monochromatic reading, in such a manner that plural light sources of mutually different light emission wavelengths are turned on in succession, and that the turn-on period of at least one of the plural light sources becomes shorter than that in the color image reading.

In this manner it is rendered possible to achieve image reading with an appropriate light amount, without difference in the currents supplied to the light source, between the color reading and the monochromatic reading.

In another embodiment, there is provided an image reading system comprising plural light sources of mutually different light emission wavelengths, reading means for reading the image illuminated by the plural light source, thereby outputting image signals, and control means for effecting control in such a manner as to cause the reading means to effect the monochromatic image reading in a state in which at least one of the plural light sources is reduced in luminance in comparison with that in the color image reading and at least two light sources are turned on.

In another embodiment, there is also provided a light source control device for controlling light sources to be used in an image reading device, comprising plural light sources of mutually different light emission wavelengths, and control means for effecting control, in case of monochromatic image reading with the plural light sources, in such a manner as to cause the image reading device to effect monochromatic image reading in a state in which at least one of the plural light sources is reduced in luminance in comparison with that in the color image reading and at least two light sources are turned on.

In another embodiment, there is also provided a memory medium storing a program for effecting control, in case of monochromatic image reading with plural light sources of mutually different light emission wavelengths, in such a manner as to effect monochromatic image reading in state in which luminance of the light source is reduced in comparison with that in the color image reading and at least two light sources are turned on.

In this manner it is rendered possible to prevent the lowering in the illumination intensity resulting from the deterioration of the light sources, and to extend the service lift of the light sources.

In still another embodiment, there is provided an image reading system comprising plural light sources of mutually different light emission wavelengths, reading means for reading the image illuminated by the plural light sources, thereby outputting image signals, and control means for effecting control in such a manner as to cause the reading means to effect monochromatic image reading in a state in which the electric power lower supplied to at least one of the plural light sources is reduced in comparison with that in the color image reading and at least two light sources are turned on.

In still another embodiment, there is provided a light source control device for controlling light sources to be used in an image reading device, comprising plural light sources of mutually different light emission wavelengths, and control means for effecting control, in case of monochromatic image reading by the image reading, in such a manner as to reduce the electric power lower supplied to at least one of the plural light sources is reduced in comparison with that in the color image reading and at least two light sources are turned on.

In still another embodiment, there is also provided a memory medium storing a program for effecting in case of monochromatic image monochromatic reading with plural light sources of mutually different light emission wavelengths, in such a manner as to effect monochromatic image reading in a state in which the electric power supplied to at least one of the plural light source is reduced in comparison with that in the color image reading and at least two light sources are turned on.

In this manner it is rendered possible to prevent the lowering in the illumination intensity resulting from the deterioration of the light sources, and to extend the service life of the light sources.

In still another embodiment, there is provided an image reading system comprising plural light sources of mutually different light emission wavelengths, reading means for reading the image illuminated by the plural light source in the unit of a line thereby outputting image signal, and control means effecting control, in case of monochromatic image reading by the reading means, in such a manner as to turn on, in each line, a fewer number of light sources than in the color image, among the plural light sources, and to change the light sources to be turned on in every line, wherein the light source is a light emitting element and further comprising a light guiding member for guiding the light emitted from the light emitting element for irradiating the image.

In still another embodiment, there is provided a light source control device for controlling light sources to be used in an image reading device, comprising plural light sources of mutually different light emission wavelengths, and control means effecting control, in case of monochromatic image reading by the image reading device, in such a manner as to turn on, in each line, a fewer number of light sources than in the color image reading, among the plural light sources and to the light sources to be turned on in every line, wherein the light sources is a light emitting element and further comprising a light guiding member for guiding the light emitted from the light emitting element for irradiating the image.

In still another embodiment, there is also provided a memory medium storing a program for effecting monochromatic image reading by turning on, in each line, a fewer number of light sources than in the color image reading with plural light sources, and changing the light sources to be turned on in every line.

In this manner it is rendered possible to reduce the total turn-on time of each light source in monochromatic reading, to prevent the lowering in the illumination intensity resulting from the deterioration of the light sources and to extend the service life of the light sources.

Still other objects of the present invention, and the features thereof, will become fully apparent from the following description, which is to be taken in conjunction with the attached drawings.

BRIEF DESCRIPTION OF THE DRAWINGS

FIG. 7 is a block diagram of an image reading system;

FIG. 36 is a timing chart showing the LED turn-on time in color image reading.

DESCRIPTION OF THE PREFERRED EMBODIMENTS

Figure 1:
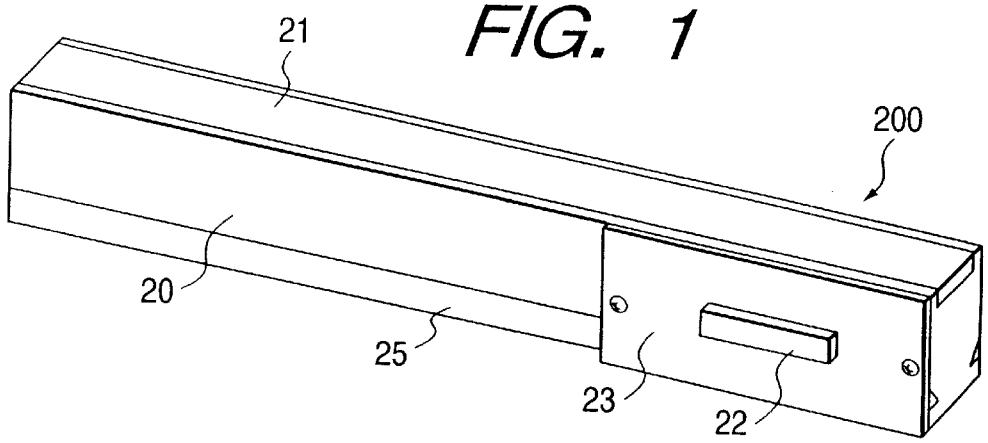
FIG. 1 is an external perspective view of a light source-switched color image sensor.
Figure 2:
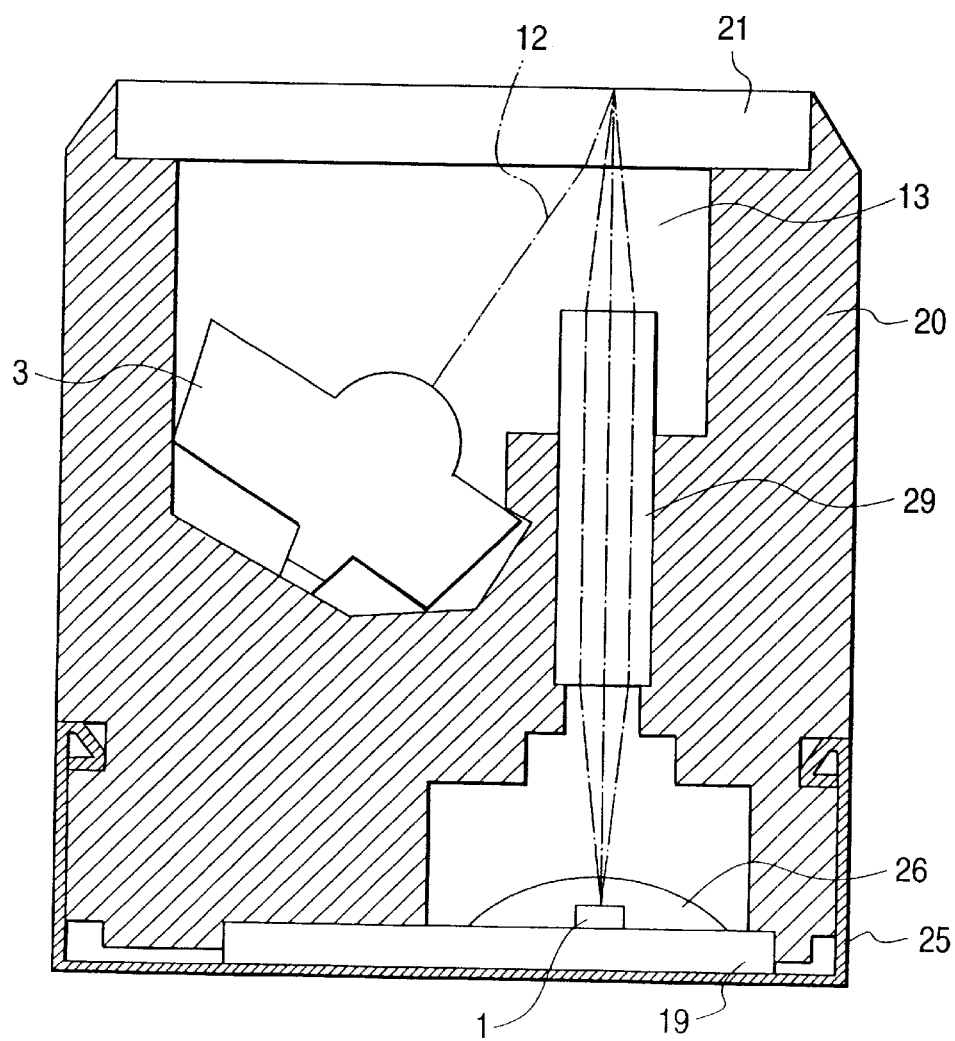
FIG. 2 is a cross-sectional view showing the internal structure of the light source-switched color image sensor.

FIGS. 1 and 2 are respectively an external perspective view and cross-sectional view, showing a first embodiment of the light source-switched color image sensor of the present invention. The color image sensor is composed of a light source in which the lights of R, G and B colors from LEDs are introduced from an end face of a light guide member and are emitted from a lateral face thereof to uniformly illuminate the original image, a short-focus imaging element array and a sensor array consisting of a linear array of plural photosensor elements.

Such color image sensor 200 is provided with a transparent glass plate 21, mounted in an upper part of a frame 20, so as to be contacted with the original image. The light 12 emerging from a light-guiding light source 3 provided in the frame 20 is reflected by the original image, maintained in contact with the upper face of the transparent glass plate 21, and, inside the frame 20, there are also provided an optical system 29 for receiving the reflected light 13 from the original image surface to be read and a sensor array 1 provided on a substrate 19 corresponding to such optical system 29. The above-mentioned optical system 29 is composed of a short-focus imaging element array, such as Celfoc lens array (trade name of Nippon Plate Glass Co.).

Figure 3:
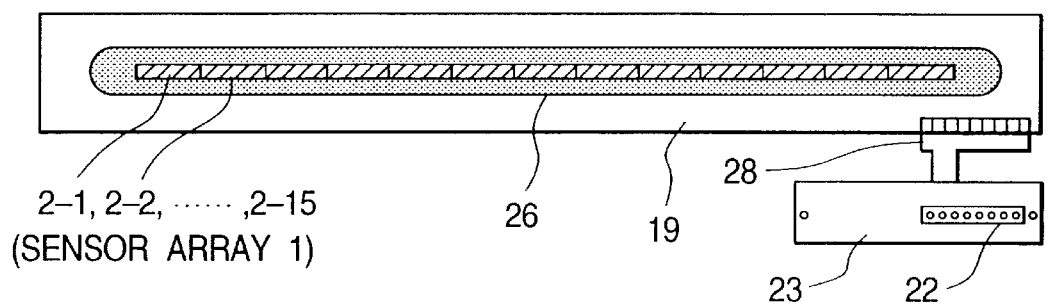
FIG. 3 is a view showing a substrate on which a sensor array is mounted.

The sensor array 1 is so-called multi-chip sensor array, consisting of a linear array of plural line sensors 2-1, 2-2, . . . , 2-15 on the substrate 19 as shown in FIG. 3, and the entire sensor array 1 is covered with a protective film 26. The substrate 19, provided with such sensor array 1, is supported by a base plate 25, engaging with the frame 20, and is connected through a flexible cable 28 to a flexible circuit board 23, which is provided thereon with a connector 22 for input/output of power supply and control signals and is mounted on the frame 20.

Figure 4:
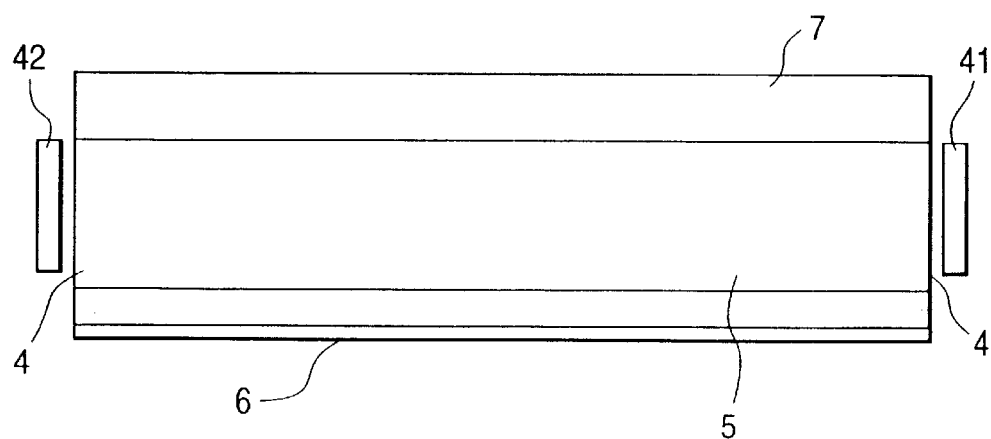
FIG. 4 is a lateral view of a light-guiding light source.
Figure 5:
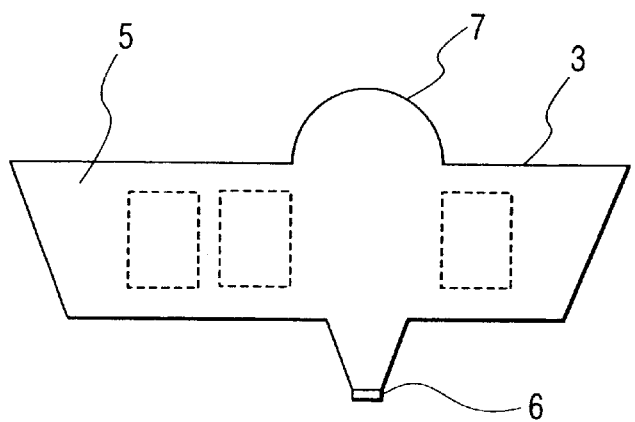
FIG. 5 is a cross-sectional view of the light-guiding light source.

FIGS. 4 and 5 are respectively a lateral view and a cross-sectional view of the light-guiding light source 3 mentioned above. Referring to FIG. 4, there are shown entrance faces 4; a light guiding portion 5 for guiding the light, entered from the entrance faces 4, in the longitudinal direction of the light-guiding light source 3; a reflecting portion 6 for diffusing and reflecting the light, guided through the guiding portion 5, toward the original image; and a condensing portion 7 for condensing the light reflected from the reflecting portion 6 in a portion to be read of the original image. LED substrates 41, 42 are mounted on the entrance faces 4 at both ends of the light-guiding light source 3 and are provided with LED packages 81 to 83 incorporating LED chips 31 to 33.

Referring to FIG. 5, broken-lined rectangles indicate the positions of the LED packages 81 to 83 on the LED substrates 41, 42. The entire configuration is so designed that the light emitted from the LED chips 31 to 33 of the LED packages 81 to 83 does not directly enter the reflecting portion 6 provided in the lower part of the light-guiding light source 3, and that the light from the LEDs is totally reflected at both ends in the transversal direction of the light guiding portion 5, whereby the light repeat internal reflection inside the light-guiding light source 3, thereby being guided in the longitudinal direction of the light guiding portion 5 with very limited loss of the light amount.

Upon entry into the reflecting portion 6 after repeated internal reflections, the light is diffused and reflected toward the original image, then is condensed by the condensing portion 7 and illuminates only the vicinity of the reading area of the original image. The illumination intensity has good uniformity on the original image since the light beam entering the reflecting portion 6 in this state is indirect light that has been reflected in the interior of the light-guiding light source 3, and also since the aperture is adjusted in the longitudinal direction.

Figure 6A:
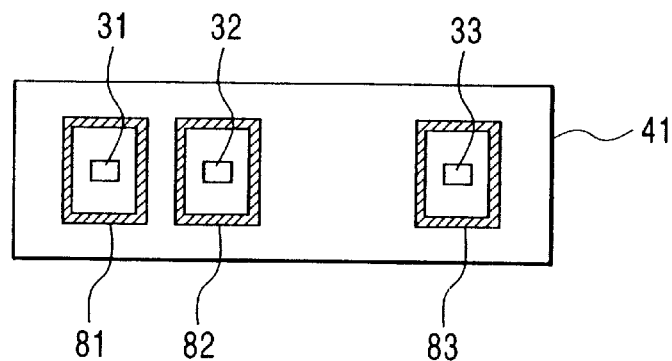
FIGS. 6A and 6B are views showing examples of arrangement of LED packages and LED chips on an LED substrate.
Figure 6B:
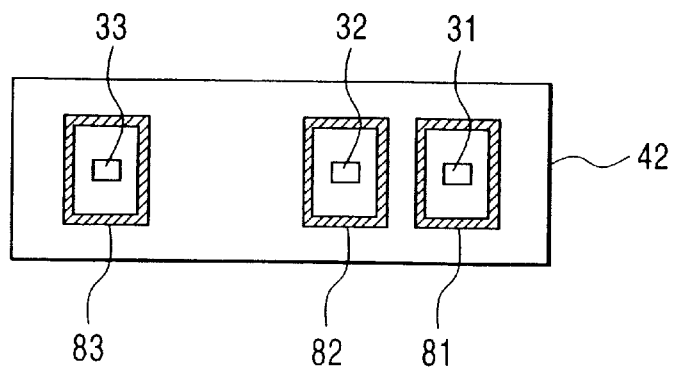

FIGS. 6A and 6B show an example of the arrangement of the LED packages 81 to 83 on the LED substrates 41, 42 and of the LED chips 31 to 33 in the LED packages 81 to 83, wherein an LED chip is incorporated in each of the LED packages. Each LED substrate is provided with one LED chip each of R, G and B colors. The lights emitted by the LED chips are not limited to R, G and B colors but can be of other colors such as yellow, cyan and magenta.

In FIGS. 6A and 6B, the LED chips 31, 32, 33 respectively emit lights of R, G and B colors. On these LED substrates 41, 42 the LED chips 31 to 33 can be turned on and off independently for the R, G and B colors.

FIG. 7 shows the configuration of a system in which an image reading device 110, incorporating the above-explained color image sensor 200, is connected to a personal computer 130. There are provided a CPU 112 for controlling the entire image reading device 110; a color image sensor 200 consisting of the light source, the CCD line sensor etc. explained in the foregoing for converting the original image into image signals; and an analog signal processing circuit 116 for applying an analog process such as gain adjustment on the analog image signal output from the color image sensor 200.

There are further provided an A/D converter 118 for converting the output signal of the analog signal processing circuit 116 into digital signals; an image processing circuit 120 for applying, utilizing a memory 122, image processing such as shading correction, gamma conversion and magnification change on the output data of the A/D converter 118; and an interface 124 for externally output the digital image data processed by the image processing circuit 120. The interface 124 adopts a standard commonly employed in the personal computers, such as SCSI or Bi-Centronics, and is connected to the personal computer 130.

The personal computer 130 is provided with a magnetooptical disk drive or a floppy disk drive, as an external or auxiliary storage device 132. There are also shown a display 134 for displaying the works executed on the personal computer 130, a mouse/keyboard 134 for entering commands into the personal computer, and an interface 135 for exchanging various data, commands and status information of the image reading device, between the personal computer and the image reading device.

The personal computer 130 is so designed that a color/monochromatic reading instruction can be entered into the image reading device from the mouse/keyboard 133. When a color/monochromatic reading instruction is entered by the mouse/keyboard 133, the CPU 136 sends a color/monochromatic reading command to the image reading device through the interface 135. Then the personal computer 130 executes light source turn-on control in the following manner, matching to the reading mode, according to a light source control program stored in a ROM 137. Such light source control program may be read from a memory medium such as a magnetooptical disk or a floppy disk loaded in the auxiliary storage 132 and may be executed by the CPU 136.

Figure 8:
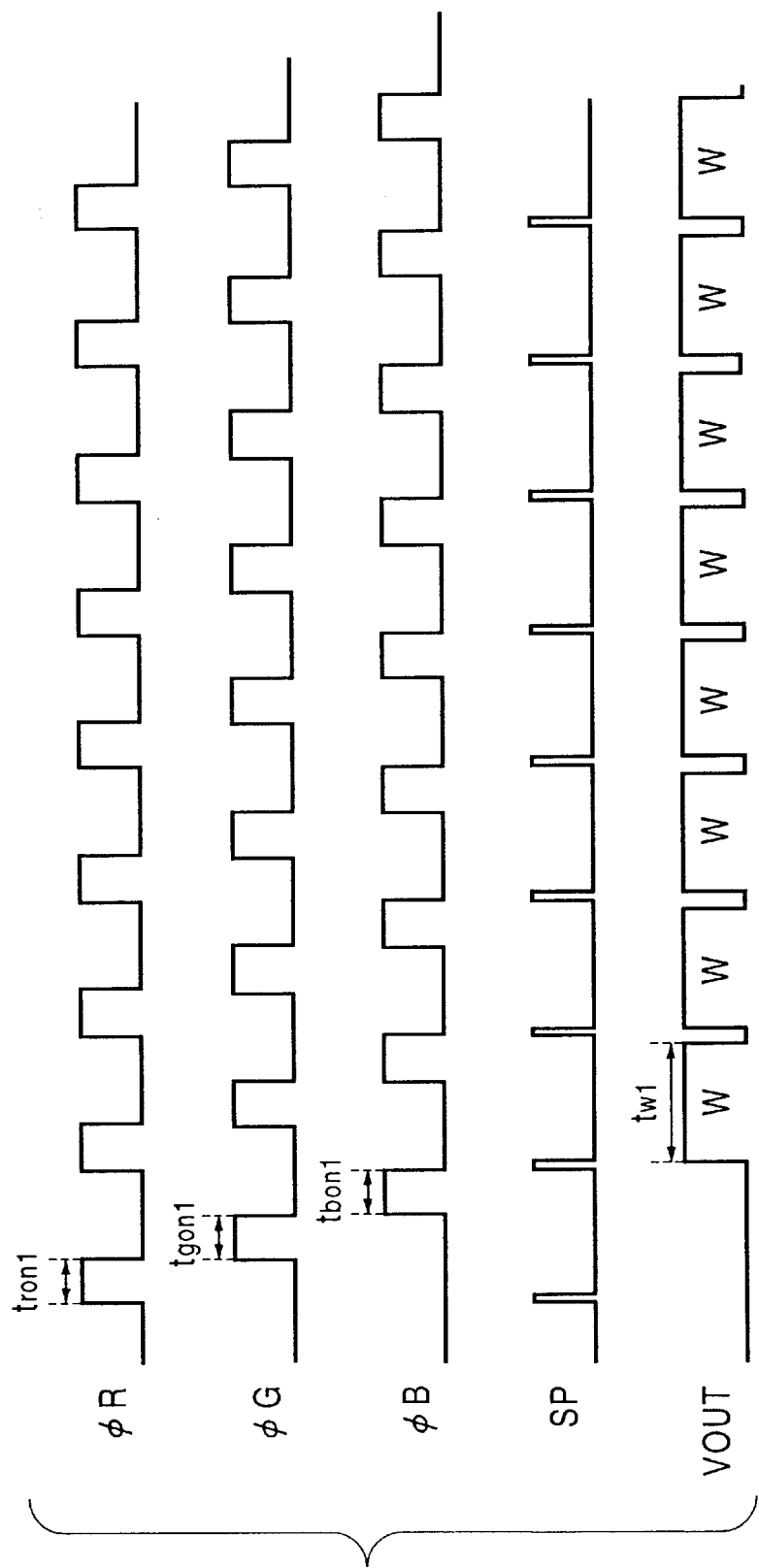
FIG. 8 is a timing chart of the black-and-white image reading in a first embodiment.

FIG. 8 is a timing chart showing the driving pulses for the image sensor unit and the output thereof in the present embodiment, in case of reading a black-and-white original image with the light source-switched color image sensor. Also FIG. 9 shows the relationship between the allowable forward current of the LED and the turn-on duty ratio thereof.

Figure 9:
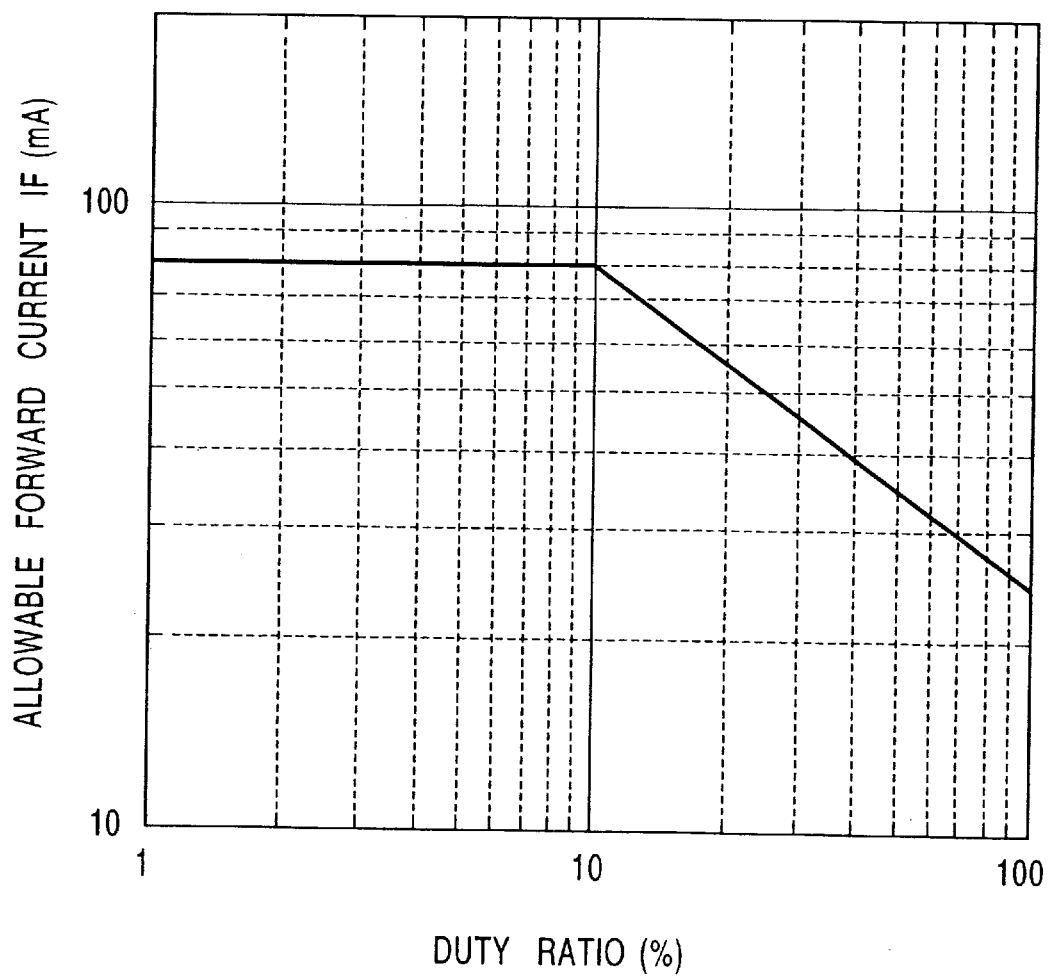
FIG. 9 is a chart showing the relationship between the allowable forward current of LED and duty ratio thereof.
Figure 37:
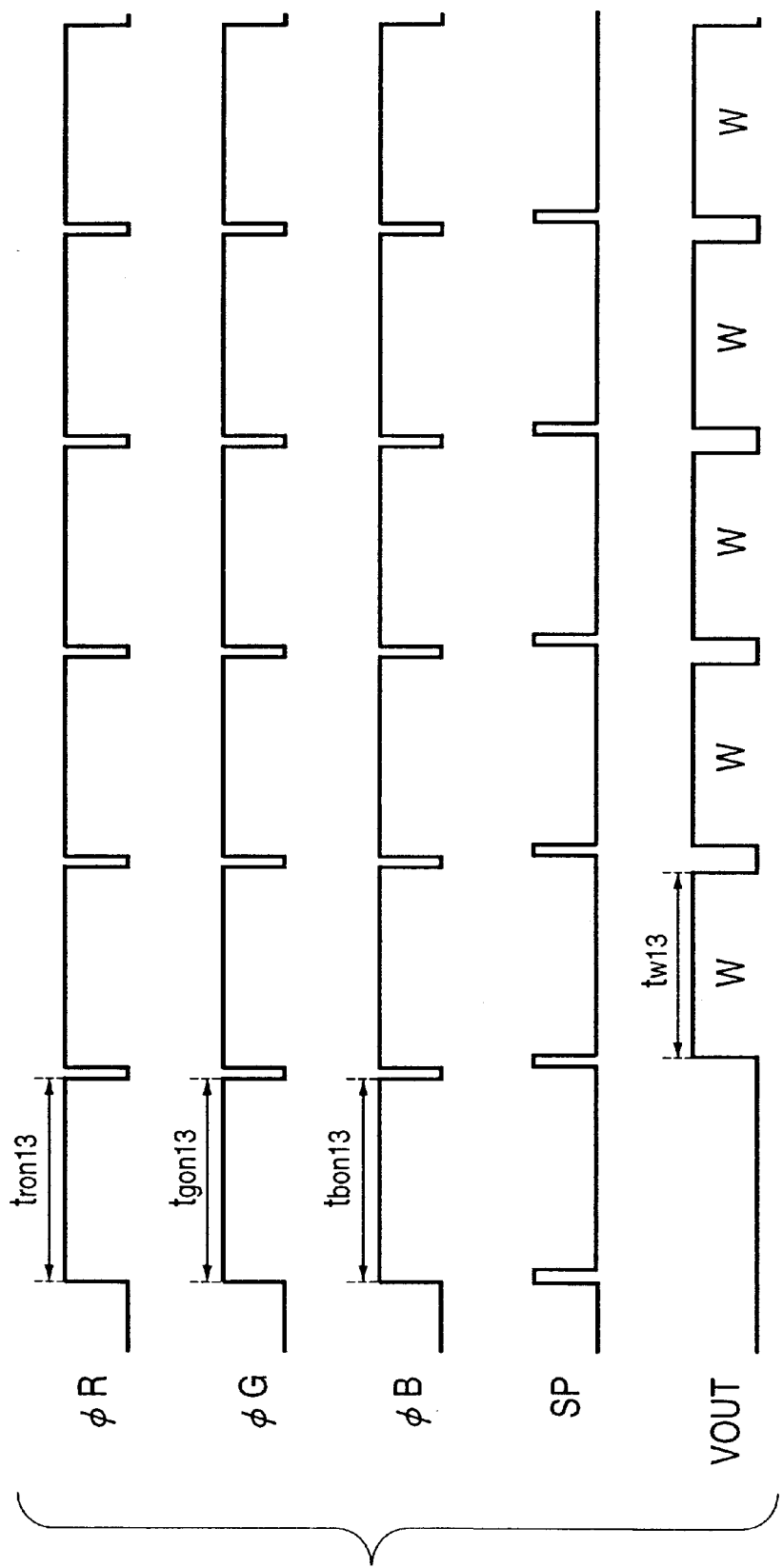
FIG. 37 is a timing chart showing the LED turn-on time in black-and-white image reading.

If all the LEDs of R, G and B colors have an allowable forward current value as shown in FIG. 9, such LEDs have a turn-on duty ratio of about 33% in the color image reading mode as shown in FIG. 36, so that the allowable forward current in such case becomes about 45 mA. On the other hand, in the black-and-white image reading mode as shown in FIG. 37, the LEDs of R, G and B colors have a turn-on duty ratio of about 100%, so that the allowable forward current in such case becomes about 25 mA.

Figure 10:
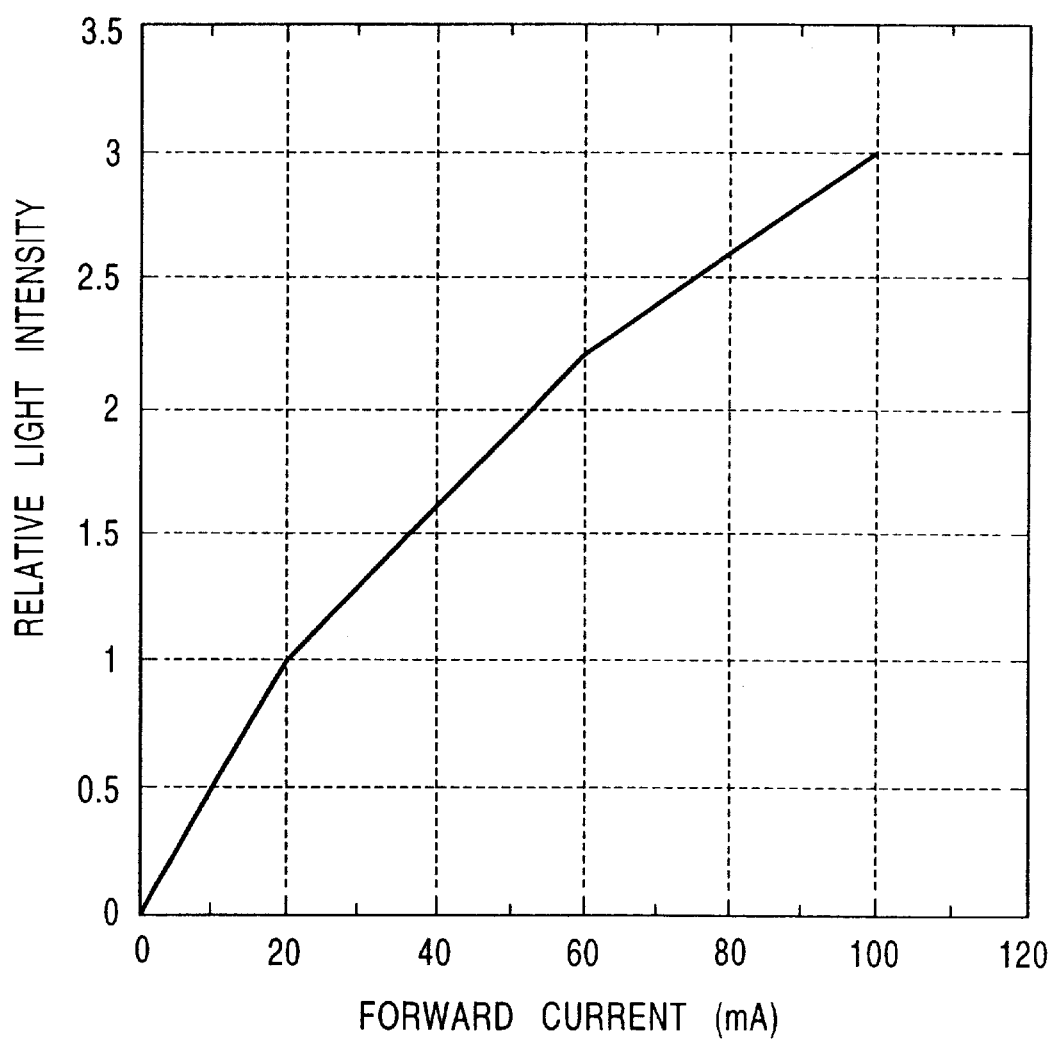
FIG. 10 is a chart showing the relationship between the forward current of LED and relative light intensity thereof.

FIG. 10 shows the relationship between the LED forward current and the relative light intensity, indicating a fact that the light intensity increases with the forward current of LED. In case of the color image reading, involving a tripled data amount in comparison with the black-and-white image reading, it is necessary to read the data at a high speed by maintaining the illumination intensity of the original as high as possible.

For this reason, in case of the color image reading, the allowable forward current is often maintained close to 45 mA.

On the other hand, in the drive timing of the present embodiment shown in FIG. 8, the turn-on duty ratio of the LEDs of R, G and B colors is about 33%, as in the case of the color image reading, so that, even if the LEDs are driven with the allowable limit of 45 mA in the color image reading, the forward current of the LEDs need not be changed in the black-and-white image reading and they can be driven under the same conditions.

Figure 11:
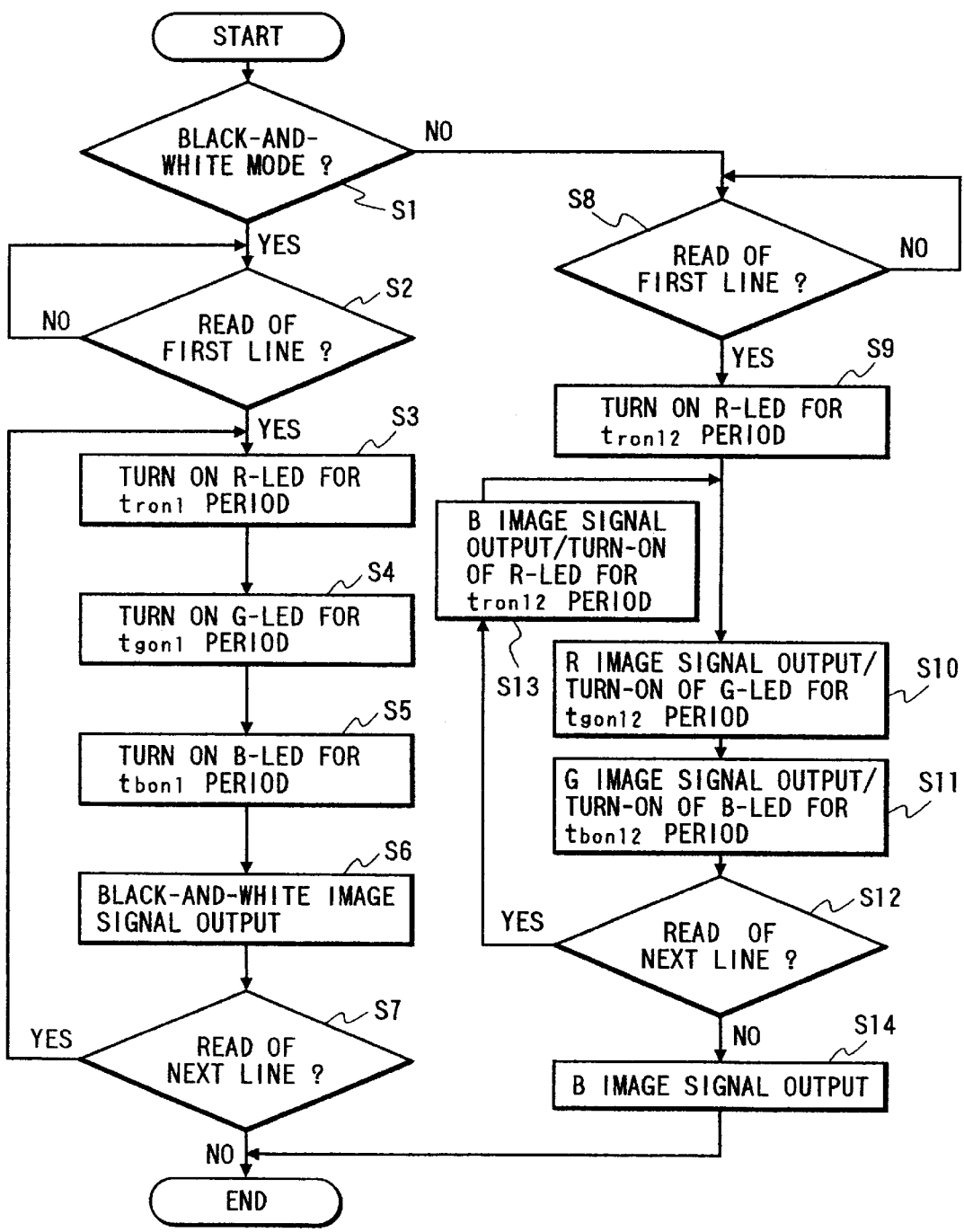
FIG. 11 is a flow chart showing the image reading operation in the first embodiment.

FIG. 11 is a flow chart of the light source control in the present embodiment. At first, a step S1 discriminates the entry of the reading mode, and, if it is the black-and-white image reading mode, the sequence proceeds to a step S2. In case of reading the image of a first line, a step S3 turns on the R LED for a period $t_{ron1}$ by a signal $\Phi R$. At the same time the sensor array is activated by a start pulse SP and a clock pulse CLK. Then the sequence proceeds to steps S4 and S5 for respectively turning on the G LED and B LED for periods $t_{gon2}$ and $t_{bon3}$ by signals $\Phi G$ and $\Phi B$. During these periods, W signals corresponding to the black-and-white image are accumulated in the pixels of the sensor array. After the image reading of a line, the image sensor unit 200 moves to a next reading line and the start pulse SP is entered again, whereupon, in a step S6, the W signals already accumulated in the pixels of the sensor array are simultaneously transferred to the analog memories of the sensor array and are then externally output one pixel by one pixel in succession.

The pixels of the sensor array store the W signals of the next reading line. After the image reading of this reading line, the image sensor unit 200 is moved to a further next reading line while the start pulse SP is entered again, whereby the W signals already accumulated in the pixels of the sensor array are simultaneously transferred to the analog memories of the sensor array and are then externally output one pixel by one pixel in succession. The black-and-white image reading of the entire original image can be achieved by repeating the above-explained sequence, while moving the image sensor unit 200 line by line in the sub scanning direction.

In case the step S1 identifies the color image reading mode, the light source is controlled in a similar manner as shown in FIG. 36. At first the sequence proceeds to a step S8 to discriminate whether the image reading is for the first line, and, if so, the sequence proceeds to a step S9 to turn on the R LED only by the signal $\Phi R$. Then sensor array is activated by the start pulse SP and the clock pulse CLK to accumulate the R signals in the pixels of the sensor array. After the lapse of the R signal accumulation time $t_{ron12}$, the R LED is turned off by the signal $\Phi R$. Then in a step S10, the G LED is turned on by the signal $\Phi G$ and the start pulse SP is entered again, whereby the R signals already accumulated in the pixels of the sensor array are simultaneously transferred to the analog memories of the sensor array and are then externally output one pixel by one pixel in succession.

In this state the G signals are at the same time accumulated in the pixels of the sensor array. After the lapse of the G signal accumulation time $t_{gon12}$, the G LED is turned off by the signal $\Phi G$. Then in a step S11, the B LED is turned on by the signal $\Phi B$ and the start pulse SP is entered again, whereby the G signals already accumulated in the pixels of the sensor array are simultaneously transferred to the analog memories of the sensor array and are then externally output one pixel by one pixel in succession.

In this state the B signals are at the same time accumulated in the pixels of the sensor array. After the lapse of the B signal accumulation time $t_{bon12}$, the B LED is turned off by the signal $\Phi B$. In case a step S12 identifies that a next line is to be read, a step S13 turns on the R LED by the signal $\Phi R$ and the start pulse SP is entered again, whereby the B signals already accumulated in the pixels of the sensor array are simultaneously transferred to the analog memories of the sensor array and are then externally output one pixel by one pixel in succession.

In this state the image sensor unit 200 has already been moved to a next reading line, and the operations are executed in a similar manner to obtain the R, G and B signals. The color image reading of the entire original image can be achieved by repeating the above-explained sequence, while moving the image sensor unit 200 line by line in the sub scanning direction.

In the present embodiment, the turn-on period of the R LED is selected as $t_{ron1}=t_{ron12}/3$, while that of the G LED is selected as $t_{gon1}=t_{ron12}/3$, and that of the B LED is selected as $t_{bon1}=t_{bon12}/3$, and the LEDs are so adjusted that the line sensor provides the output of a predetermined level when a white standard board is illuminated in the period $t_{ron12}$ by the R LED only, then in the period $t_{gon12}$ by the G LED only and in the period $t_{bon12}$ by the B LED only. Therefore the output of a same level can be obtained from the line sensor also when the white standard board is illuminated by the R, G and B LEDs respectively for the periods $t_{ron1}$, $t_{gon1}$ and $t_{bon1}$.

Consequently, the turn-on control of the R, G and B LEDs as shown in FIG. 8 allows to read a line of the black-and-white original image within a reading time same as that per color per line in the color image reading. Thus, as the start pulses SP and the clock signals CLK can be same as those in the color image reading mode, the output signal Vout of the image sensor can be output in the same timing as in the color image reading, and the signal processing circuit can also be same.

Also, the turn-on control pulses $\Phi R$, $\Phi G$, $\Phi B$ for the LEDs can be generated easily because the turn-on and turn-off timings for the R, G and B LEDs in FIG. 8 are same as those in the color image reading mode, except that the turn-on period of each LED is reduced to $\frac{1}{3}$ without the change in the turn-on duty ratio in each of the R, G and B LEDs. Also in contrast to the conventional black-and-white image reading mode shown in FIG. 37, the R, C and B LEDs are not turned on at the same time, so that the LED substrates 41, 42 show smaller increase in temperature, thus improving the reliability.

In the above-explained driving method of the present embodiment in the light source-switched color image sensor utilizing the R, G and B LEDs, there is always obtained the advantage that the forward current need not be changed between the color reading mode and the black-and-white reading mode, regardless of the relationship between the allowable forward current of the LED and the duty ratio thereof shown in FIG. 9. Also the signal processing can be same in both modes, because the reading time for the black-and-white image is exactly $\frac{1}{3}$ of that for the color image so that the output signals can be obtained at the same timing for the black-and-white image and for the color image.

As explained in the foregoing, the driving conditions of the present embodiment for the color image sensor unit enable easy reading of the black-and-white image, with the LED drive circuit, the sensor array drive circuit and the signal processing circuit same as those for the color image reading mode.

Figure 12:
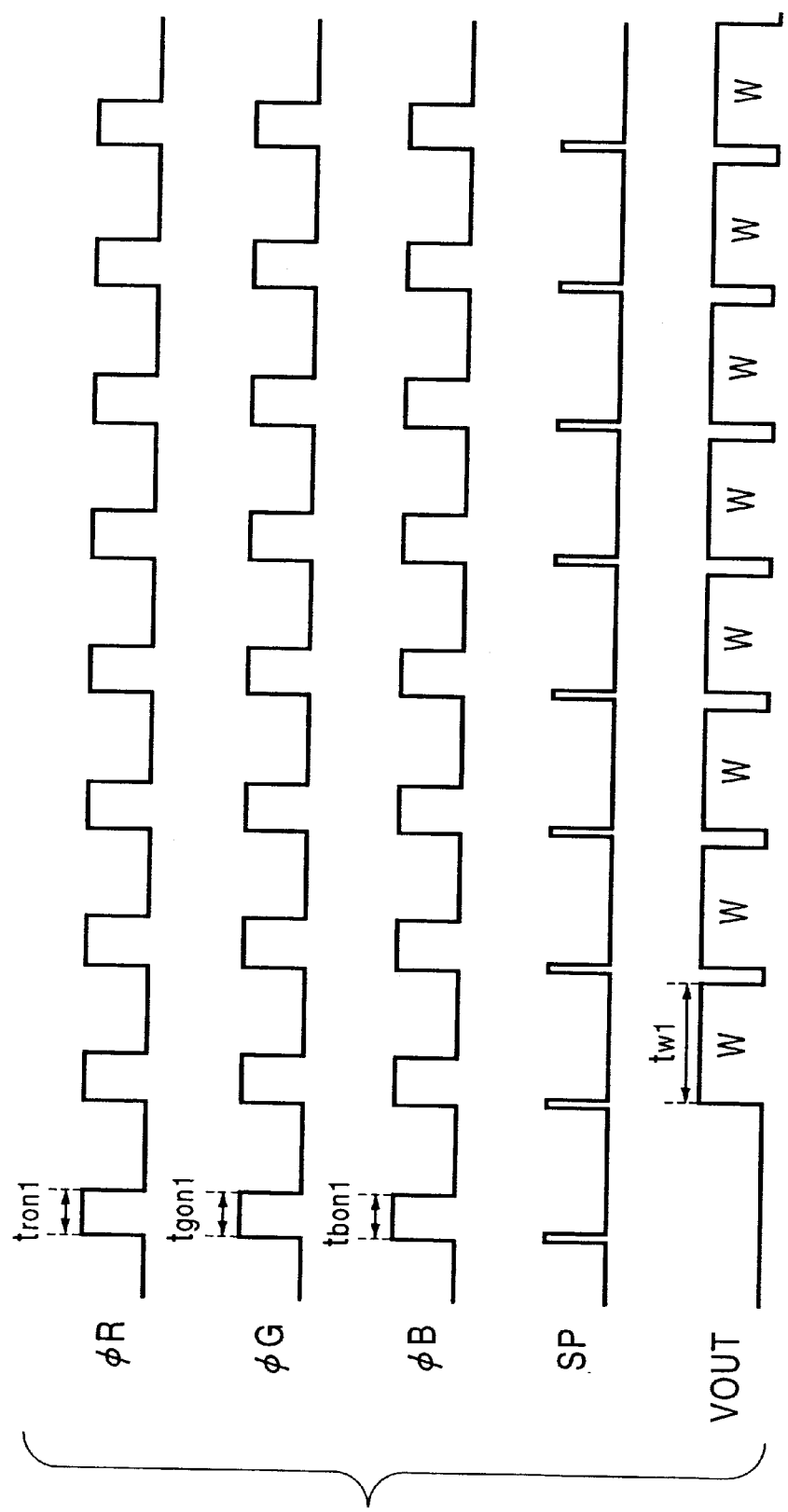
FIG. 12 is a timing chart in the black-and-white image reading in a second embodiment.

FIG. 12 shows a timing chart of a second embodiment of the present invention, showing the turn-on timings of the R, G and B LEDs and the output timings of the image sensor in case of the black-and-white image reading as in FIG. 8.

Figure 13:
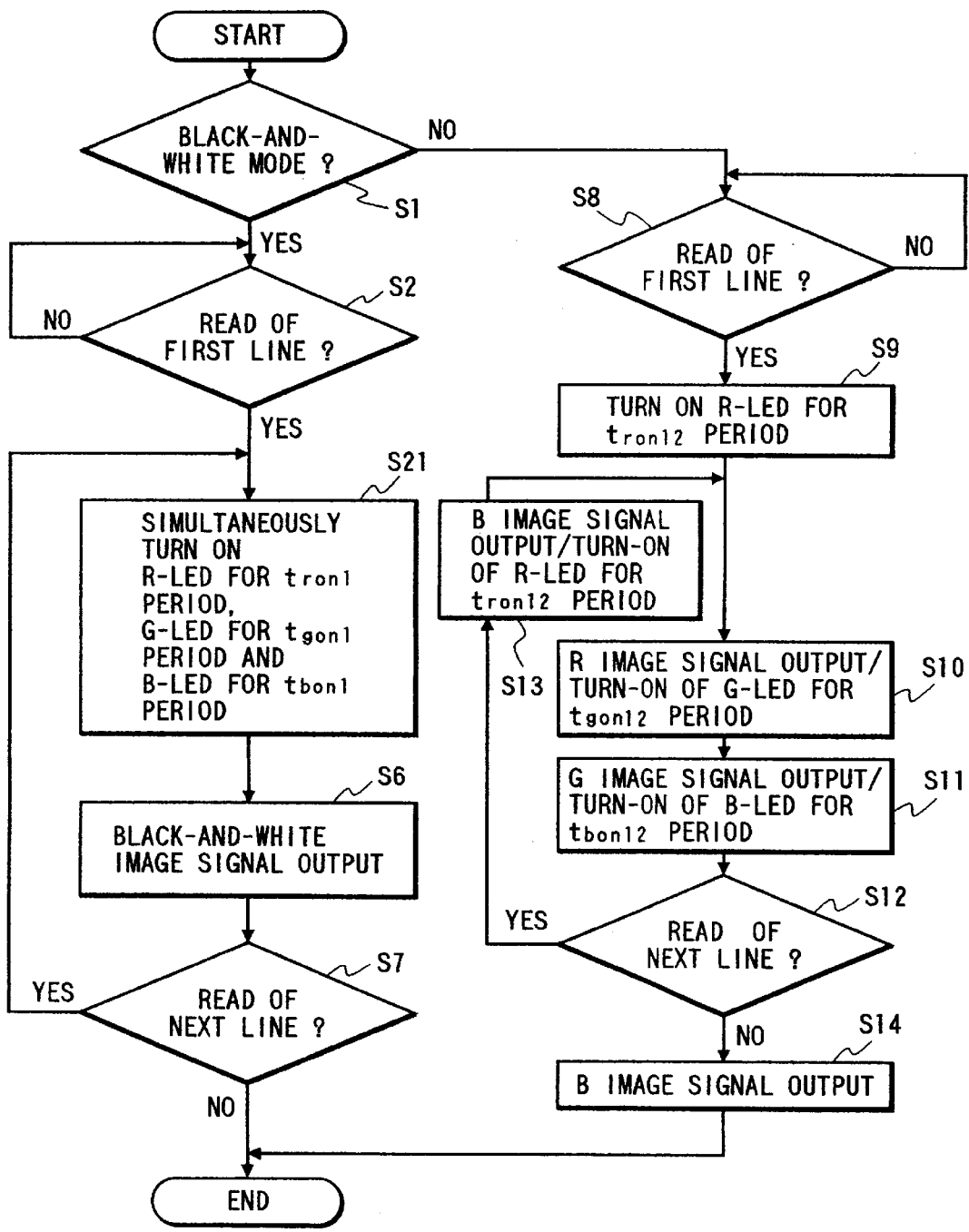
FIG. 13 is a flow chart showing the image reading operation in a second embodiment.

FIG. 13 is a flow chart for the light source control in the present embodiment. At first, when the image reading mode is entered in a step S1, the sequence proceeds to a step S2 in case of the black-and-white image reading mode, and, in case of reading the image of a first line, the sequence proceeds to a step S21 to simultaneously turn on the R, G and B LEDs respectively for periods $t_{ron1}$, $t_{gon2}$ and $t_{bon3}$ by the signals ΦR, ΦG and ΦB. Also the sensor array is activated by the start pulse SP and the clock pulse CLK, whereby W signals corresponding to the black-and-white image are accumulated in the pixels of the sensor array. After the image reading of a line, the image sensor unit 200 is moved to a next line and the start pulse SP is entered again, whereby, in a step S6, the W signals accumulated in the pixels of the sensor array are simultaneously transferred to the analog memories of the sensor array and are transferred to the exterior one pixel by one pixel in succession.

The function in case the step S1 identifies the color reading mode is same as already explained in relation to FIG. 11 and will not, therefore, be explained further. The relationship between $t_{ron1}$, $t_{gon1}$, $t_{bon1}$ and $t_{ron12}$, $t_{gon12}$, $t_{bon12}$ is same as that in the first embodiment.

In the present embodiment, all the R, G and B LEDs are simultaneously turned on in the reading time of the black-and-white image of a line and the black-and-white image is reproduced from the output signals of the plural line sensors. The black-and-white image reading of a line is completed within a time same as the turn-on period of the R, G or B LED in the color image reading mode shown in FIG. 36. Consequently the start pulses SP and the clock pulses CLK can be same as those in the color image reading, and the signal processing circuit can be same since the output signals Vout of the image sensor can be obtained in the same timings as those in the color image reading.

Figure 14:
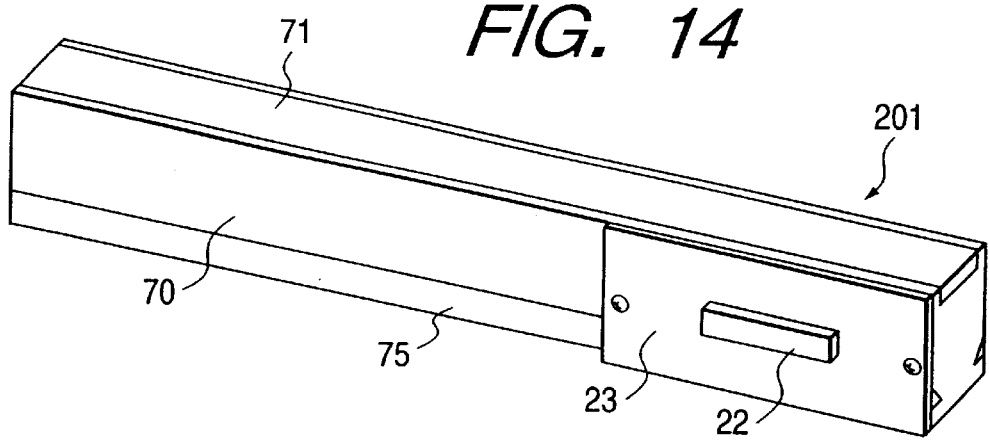
FIG. 14 is an external perspective view of a color image sensor constituting a third embodiment.
Figure 15:
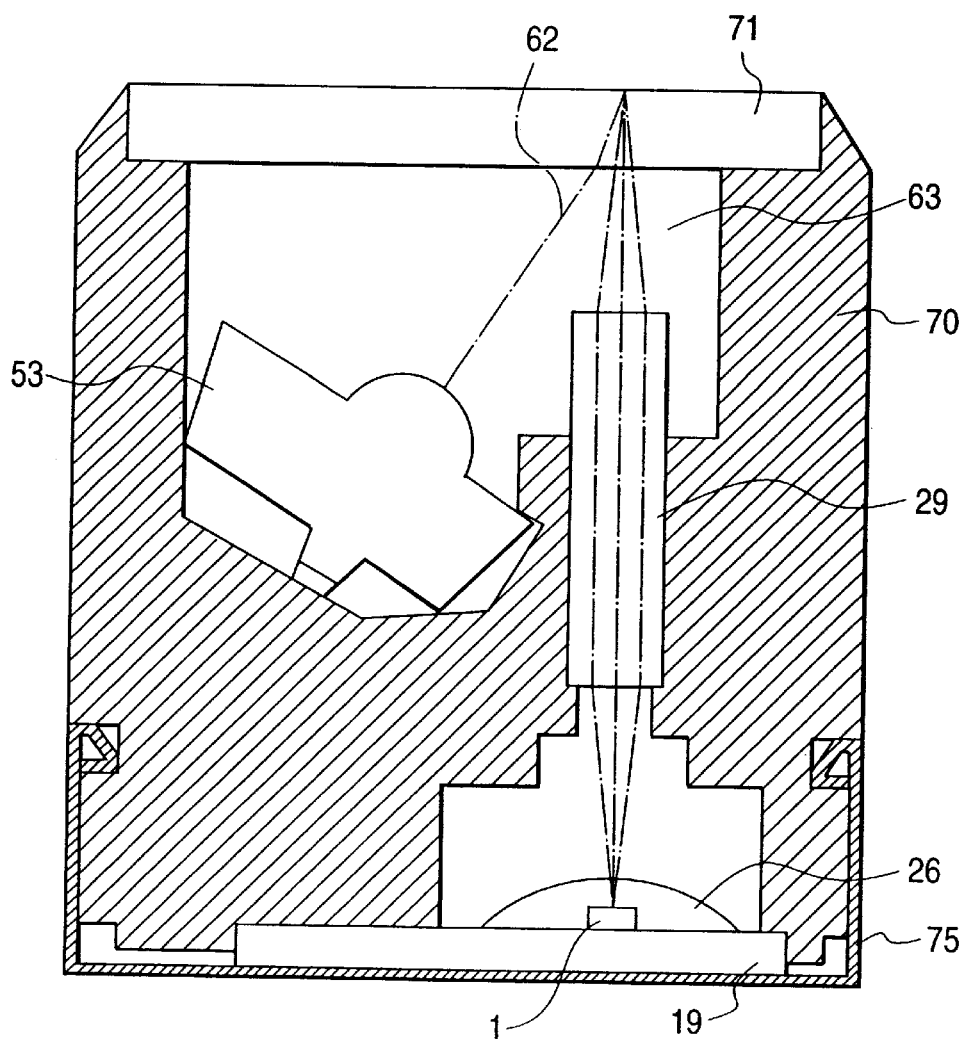
FIG. 15 is a cross sectional view showing the internal structure of the color image sensor of the third embodiment.

FIGS. 14 and 15 are respectively an external perspective view and a cross-sectional view of a light source-switched color image sensor in a third embodiment of the present invention, wherein the configuration of the principal parts is same as that in the color image sensor 200 shown in FIGS. 1 and 2, except that the frame 20 is replaced by a frame 70, the transparent glass plate 21 is replaced by a transparent glass plate 71, the base plate 25 is replaced by a base plate 75, and the light-guiding light source 3 is replaced by a light-guiding light source 53.

Figure 16:
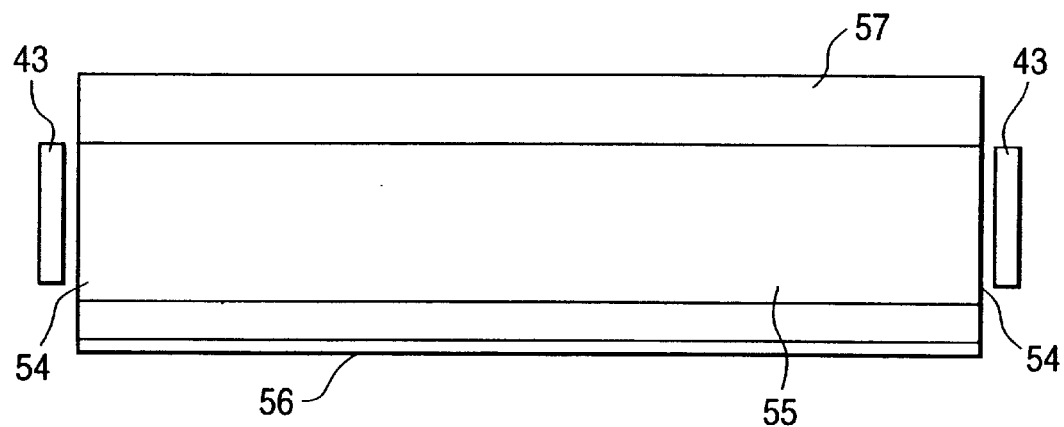
FIG. 16 is a schematic view of a substrate on which a sensor array is mounted.
Figure 17:
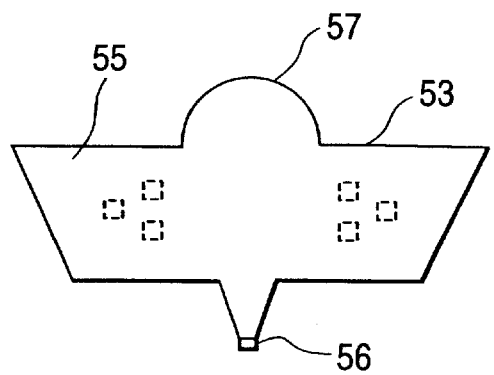
FIG. 17 is a cross sectional view of the substrate with the mounted sensor array.

FIGS. 16 and 17 respectively show the longitudinal shape and the cross section of the light-guiding light source 53, wherein LED substrates 43, 44 are mounted on entrance faces 54 at both ends. There are also shown a light guiding portion 55 for guiding the light emitted from the LED chips 31 to 33 in the longitudinal direction of the light-guiding light source 53, a reflecting portion 56 for diffusing and reflecting the light, guided in the light guiding portion 55, toward the original image, and a condensing portion 57 for condensing the light reflected from the reflecting portion 56 into a portion to be read of the original image. Broken-lined rectangles indicate the positions of the LED chips 31 to 33 on the LED substrate 43.

Figure 18:
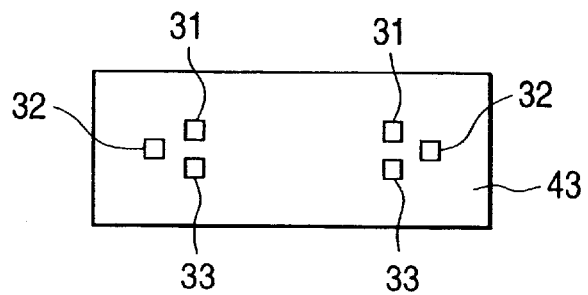
FIG. 18 is a view showing an example of arrangement of the LED chips on the substrate.

FIG. 18 shows the arrangement of the LED chips 31 to 33 of three kinds for R, G and B colors on the LED substrate 43, and two LEDs of each kind are directly mounted on the LED substrate 43. As in the first embodiment, these LEDs can be independently turned on and off for each of the R, G and B colors.

Though not illustrated, the LED chips 31 to 33 of three kinds for R, G and B colors are directly mounted also on the LED substrate 44, in the same manner as on the substrate 43.

The light emitted from the LED chips 31 to 33 on these LED substrates 43, 44 illuminates only the vicinity of the area to be read of the original, in the same principle as in the first embodiment, but, since the LED chips 31 to 33 are directly mounted on the LED substrates 43, 44, these substrates 43, 44 and the light-guiding light source 53 are made smaller than the LED substrates 41, 42 and the light-guiding light source 3 in the first embodiment. Also each entrance face of the light-guiding light source has a larger number of LED chips mounted thereon, thereby illuminating the original image with a higher illumination intensity and enabling the color image reading with a higher speed.

Figure 19:
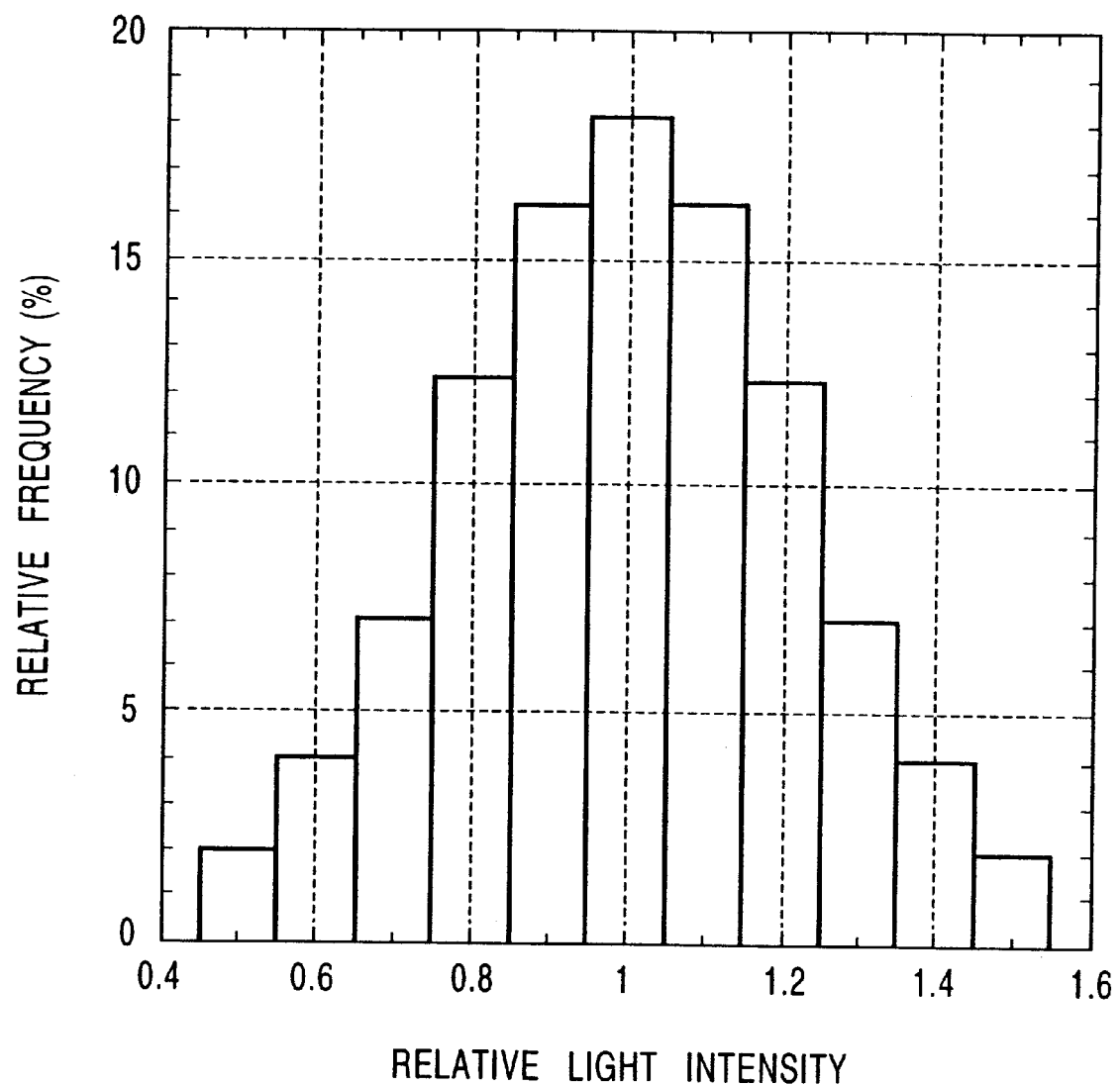
FIG. 19 is a chart showing the distribution of the relative light intensity of LED chips.

The LED chips employed for illuminating the original image in the color image sensor unit of the present embodiment are associated, because of the manufacturing process thereof, with a fluctuation in the light intensity of a distribution shown in FIG. 19, so that the illumination of the original image has to be made in consideration of the fluctuation in the light intensity of about 3 times. For this reason, the turn-on period of each LED chip is regulated according to the light intensity thereof as shown in FIG. 20, so as to obtain a constant output level from the sensor when the standard white board is illuminated.

More specifically, in case of incorporating a darkest LED chip, with a relative light intensity of 0.5, in the image sensor unit, the predetermined output level is obtained from the sensor by turning on the LED chip for the entire reading time of a line, and, for a brighter LED chip, such predetermined output level is obtained by shortening the turn-on period of the LED in proportion to the light intensity in comparison with that of the darkest LED chip with the relative light intensity of 0.5.

Figure 20:
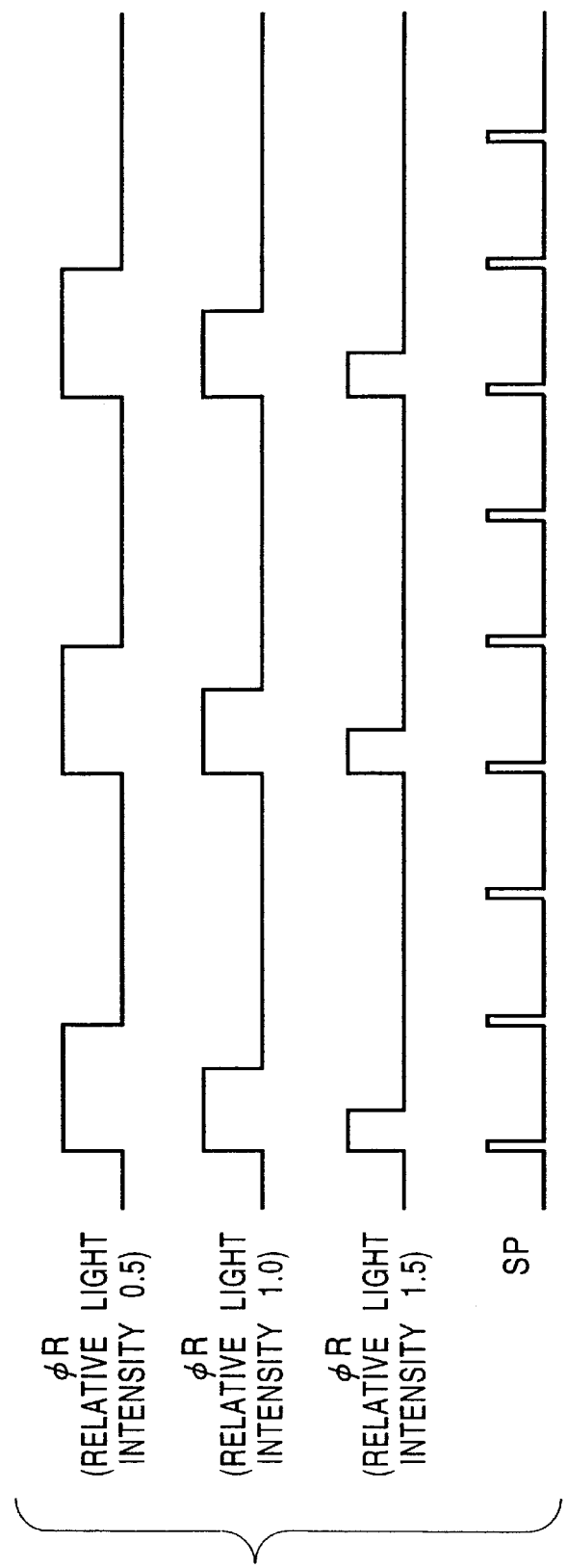
FIG. 20 is a chart showing changes in turn-on time of the LED in the third embodiment.
Figure 35:
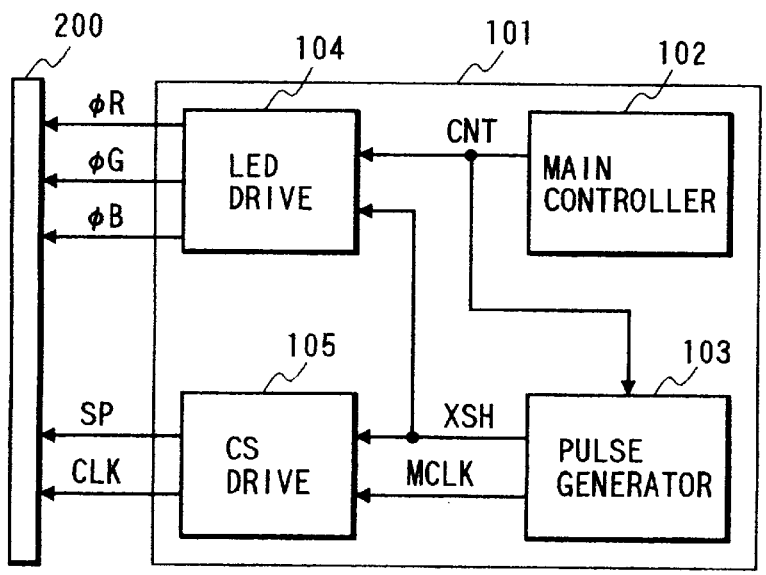
FIG. 35 is a block diagram of a driving circuit for a light source-switched color image sensor.

As explained in the foregoing, the light source-switched color image sensor of the present embodiment is controlled, as in the first embodiment, by the image sensor drive circuit 101 shown in FIG. 35, and the control signals ΦR, ΦG, ΦB, SP, CLK as shown in FIG. 20 are supplied to the light source-switched image sensor unit 201 to execute the image reading operation in the following manner.

At first, prior to the actual image reading operation, the R, G and B LEDs are respectively turned on and the respective turn-on periods $t_{ron19}$, $t_{gon19}$, $t_{bon19}$ are so determined as to obtain a predetermined output level from the sensor when the standard white board is illuminated.

Figure 21:
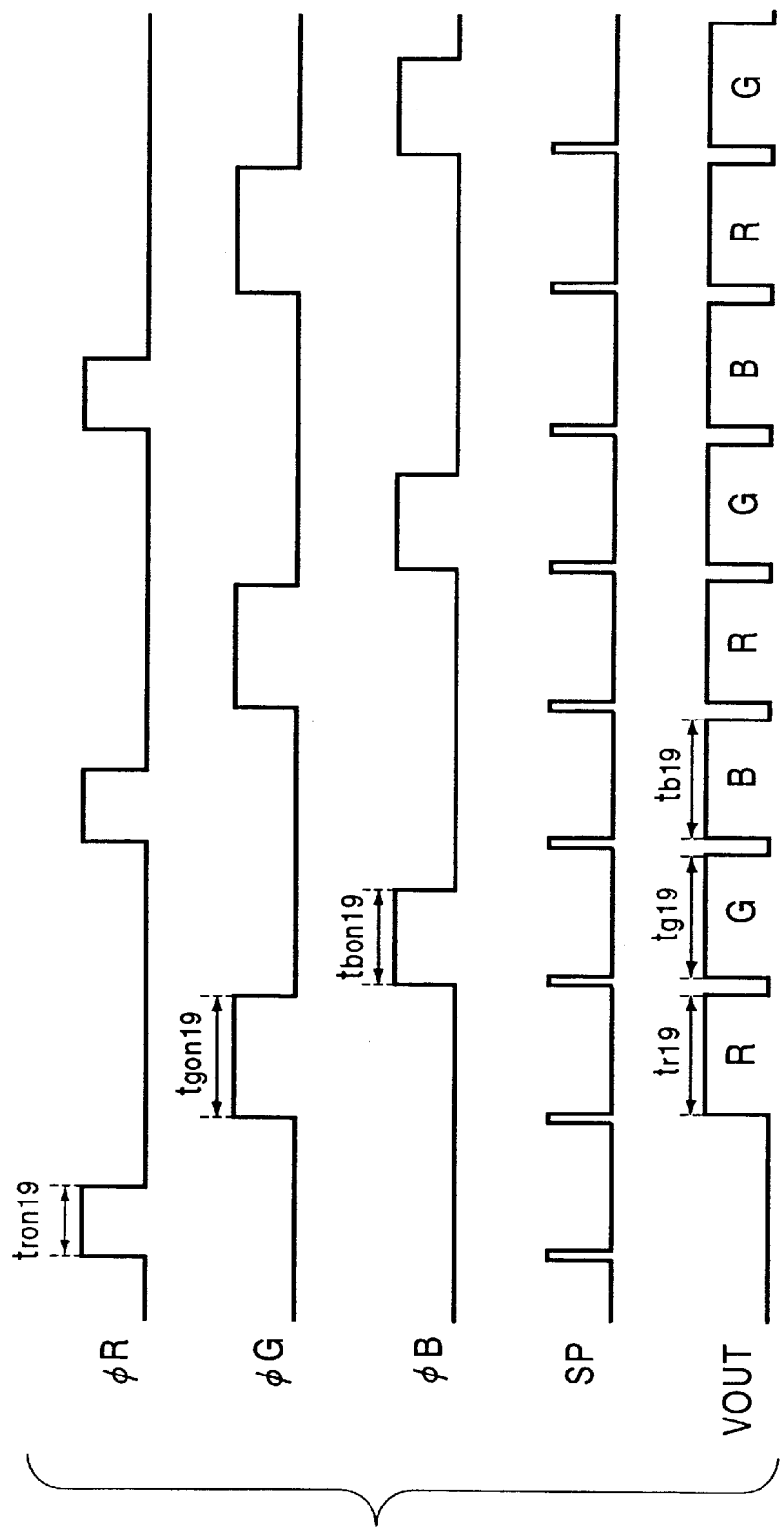
FIG. 21 is a timing chart showing the LED turn-on time in the color image reading in the third embodiment.
Figure 23:
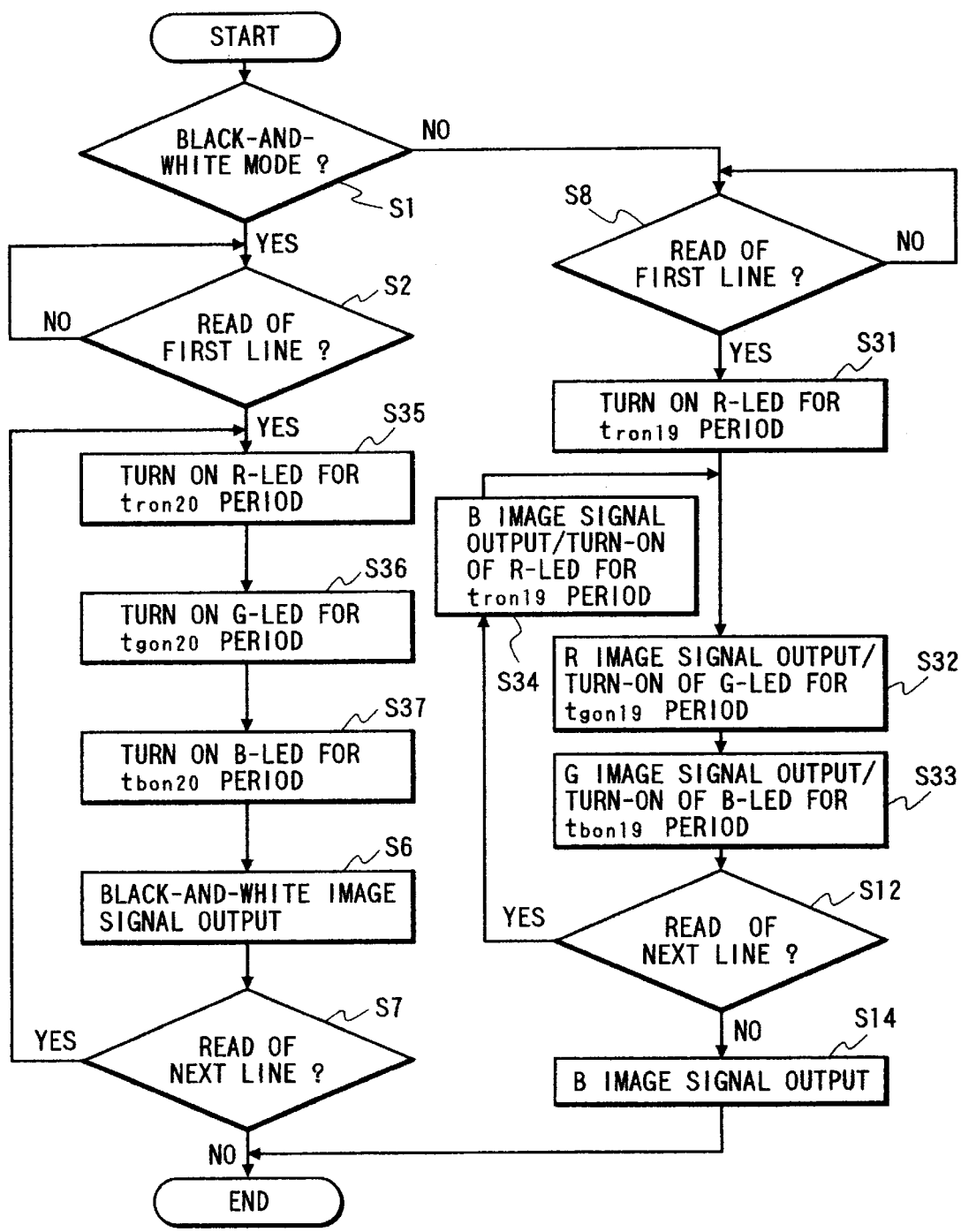
FIG. 23 is a flow chart showing the image reading operation in the third embodiment.

Then the actual image reading operation is executed in the manner shown in FIGS. 21 and 23, as in the first embodiment. In the color reading mode, in a step S31, the R LED alone is turned on, and is turned off after the period $t_{ron19}$ determined in advance by the irradiation of the standard white board. At the same time the sensor array is activated by the start pulse SP and the clock pulse CLK, whereby the R signals are accumulated in the pixels of the sensor array. The signal accumulation times (signal read-out times) $t_{r19}$, $t_{g19}$, $t_{b19}$ for the R, G and B colors are determined corresponding to the light intensity of the darkest LED chip, and the G LED chip is normally not turned on immediately after the R LED chip is turned off.

After the lapse of the predetermined R signal accumulation time, in a step S32, the G LED is turned on and the start pulse SP is entered again, whereby the R signals already accumulated in the pixels of the sensor array are simultaneously transferred to the analog memories of the sensor array and are then output to the exterior in succession, pixel by pixel. At the same time, in this state, G signals are accumulated in the pixels of the sensor array.

The G LED is turned off after the period $t_{gon19}$ determined in advance by the irradiation of the standard white board.

The G signal accumulation time is also determined corresponding to the light intensity of the darkest LED chip, so that the B LED chip is not turned on until the lapse of such predetermined time. In a step S33, after the lapse of the G signal accumulation time, the B LED is turned on and the start pulse SP is entered again, whereby the G signals already accumulated in the pixels of the sensor array are simultaneously transferred to the analog memories of the sensor array and are then output to the exterior in succession, pixel by pixel. At the same time, in this state, B signals are accumulated in the pixels of the sensor array.

The B LED is turned off after the period $t_{bon19}$ determined in advance by the irradiation of the standard white board. The B signal accumulation time is also determined corresponding to the light intensity of the darkest LED chip as in the case or R and G signal accumulation times, so that the R LED chip is not turned on until the lapse of such predetermined time. After the lapse of the B signal accumulation time, the image sensor unit 201 is moved to a next reading line, and, in a step S34, the R LED is turned on and the start pulse SP is entered again, whereby the B signals already accumulated in the pixels of the sensor array are simultaneously transferred to the analog memories of the sensor array and are then output to the exterior in succession, pixel by pixel. At the same time, in this state, R signals are accumulated in the pixels of the sensor array.

The color image reading over the entire original image, based on the LED chips involving certain distribution in the light intensity, can thus be achieved by repeating the above-explained process while moving the image sensor unit 200 line by line in the sub scanning direction.

In the black-and-white image reading mode, the image sensor drive circuit 101 provides the light source-switched image sensor unit 201 with control signals ΦR, ΦG, ΦB, SP and CLK as shown in FIG. 18, thereby executing the image reading operation in the following manner.

Figure 22:
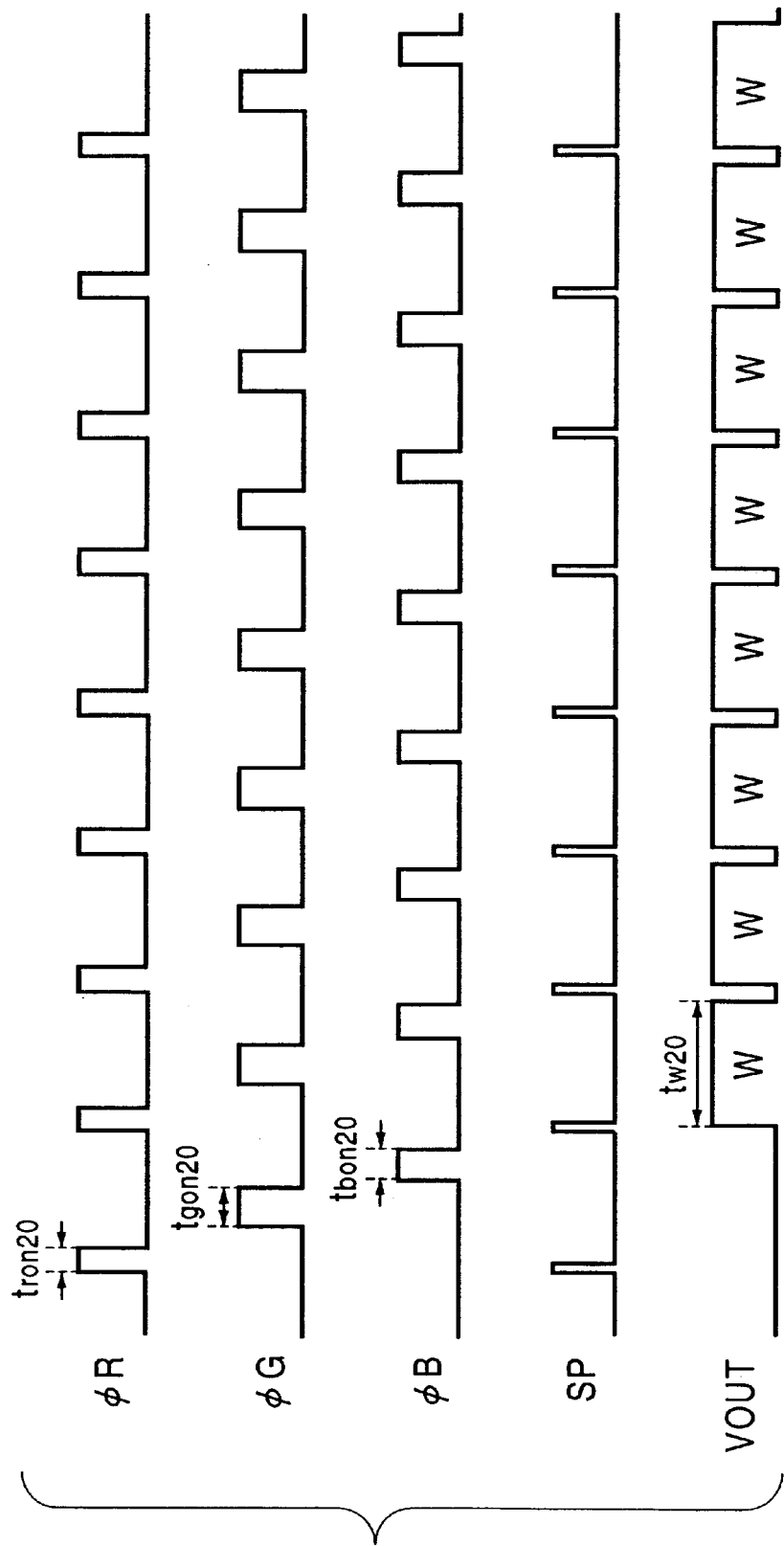
FIG. 22 is a timing chart showing the LED turn-on time in the black-and-white image reading in the third embodiment.

At first, prior to the actual image reading operation, the R, G and B LEDs are respectively turned on and the respective turn-on periods $t_{ron20}$, $t_{gon20}$, $t_{bon20}$ are so determined as to obtain, from the sensor upon irradiation of the standard white board, an output level which is equal to ⅓ of the predetermined output level in the color image reading mode. Then, as shown in FIG. 22, the R, G and B LEDs are turned on in succession for respective periods of $t_{ron20}$, $t_{gon20}$, $t_{bon20}$ within the reading time for one color and for a line in case of the color image reading mode, thereby providing, from the line sensor, an output level same as that in the color image reading mode. The above-mentioned determination of the turn-on periods of the R, G and B LEDs provides relationships $t_{ron20}=t_{ron19}/3$, $t_{gon20}=t_{gon19}/3$ and $t_{bon20}=t_{bon19}/3$, so that the ratio of the turn-on periods of each LED in the black-and-white reading mode and in the color reading mode becomes 1:3 as in the first embodiment.

After the determination of the turn-on periods of the R, G and B LEDs in this manner, the actual image reading operation is executed according to the timing chart shown in FIG. 22. The sensor array is activated by the start pulse SP and the clock pulse CLK, and, in steps S35, S36 and S37 shown in FIG. 23, the R, G and B LEDs are turned on in succession for respective periods $t_{ron20}$, $t_{gon20}$, $t_{bon20}$ within the reading time of a line, whereby W signals corresponding to the black-and-white image are accumulated in the pixels of the sensor array. As in the foregoing embodiment, the W signal accumulation time $t_{w20}$ is determined in advance in consideration of the case of color image reading with darkest R. G and B LED chips, so that $t_{w20}=t_{r19}=t_{g19}=t_{b19}$.

After the lapse of the above-mentioned predetermined period $t_{w20}$, the image sensor unit 201 is moved to a next reading line, and the start pulse SP is entered again whereby, in a step S6, the W signals of the preceding reading line already accumulated in the pixels of the sensor array are simultaneously transferred to the analog memories of the sensor array and are then output to the exterior in succession, pixel by pixel. In this state, the R, G and B LEDs are turned on, as in the preceding reading line, in succession for respective periods of $t^{ron20}$, $t^{gon20}$, $t^{bon20}$ within the reading time of a line whereby the W signals corresponding to such next reading line are accumulated in the pixels of the sensor array. The color image reading over the entire original image, based on the LED chips involving certain distribution in the light intensity, can thus be achieved by repeating the above-explained process while moving the image sensor unit 201 line by line in the sub scanning direction.

The above-explained driving method of the color image sensor with the timings shown in FIG. 22 allows to read the black-and-white original image within a reading time equal to ⅓ of that for the color image reading, even when the LED chips showing certain distribution in the light intensity are used with light intensity adjustment. This driving method allows to use same signal processing for the black-and-white reading mode and the color reading mode because the output signals can be obtained in the same timings in both modes. Consequently the black-and-white image reading can be easily achieved with the color image sensor unit combined with an LED drive circuit, a sensor array drive circuit and a signal processing circuit.

Figure 24:
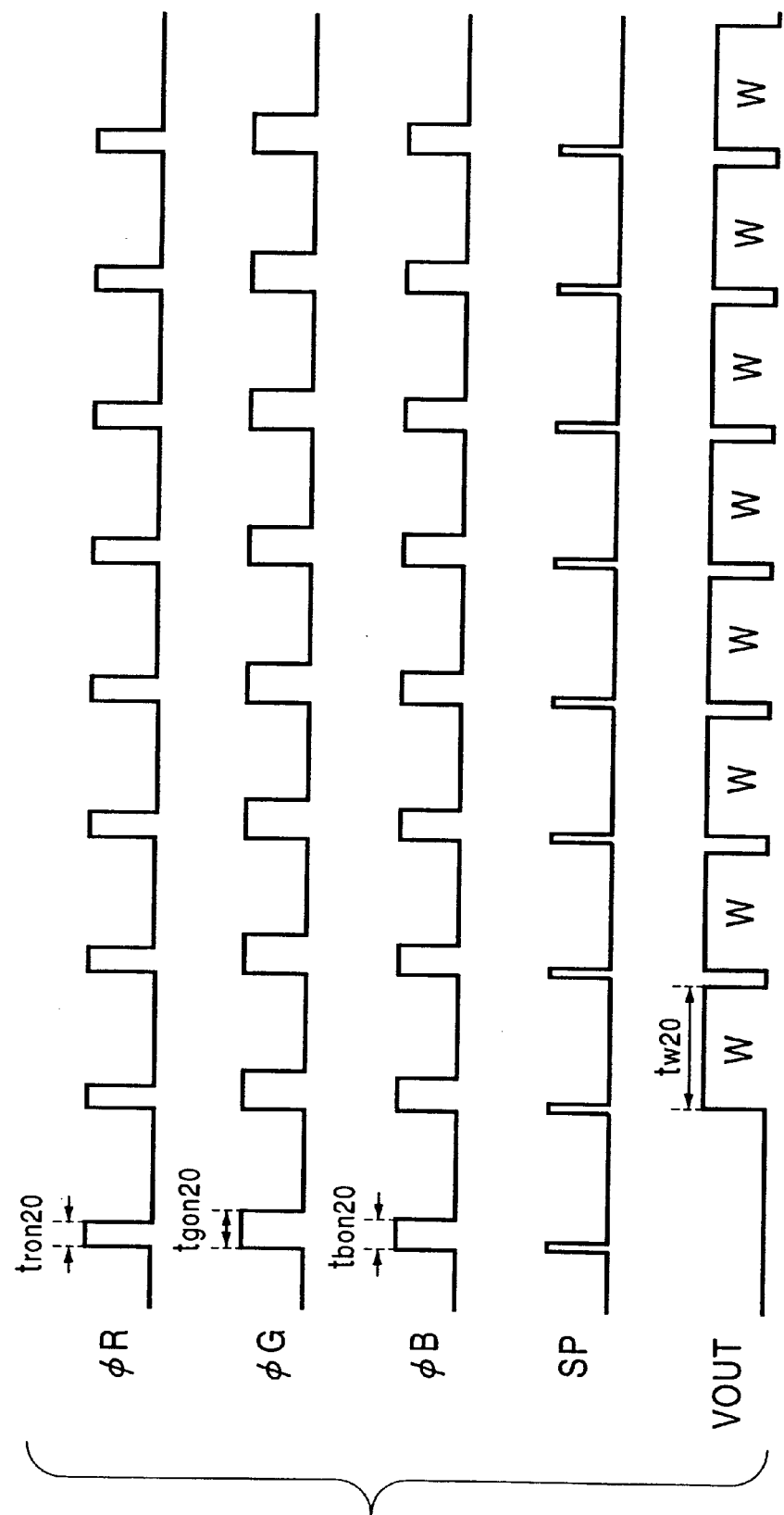
FIG. 24 is a timing chart of the black-and-white image reading operation in a fourth embodiment.
Figure 25:
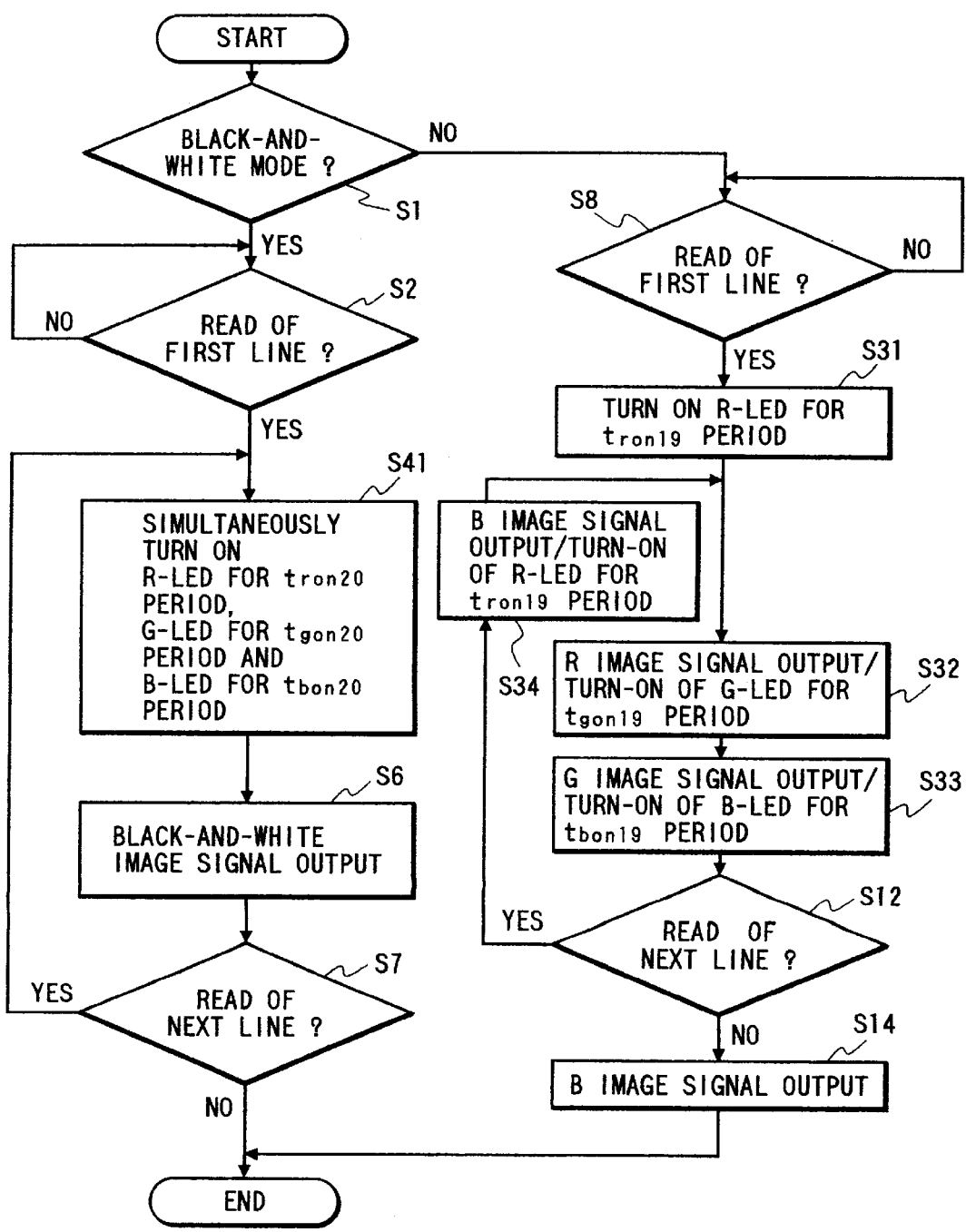
FIG. 25 is a flow chart showing the image reading operation in the fourth embodiment.

FIG. 24 is a timing chart showing the function of a fourth embodiment of the present invention, showing the turn-on timings of the R, G and B LEDs and the output timing of the image sensor in the black-and-white image reading as in FIG. 12, and FIG. 25 is a flow chart showing the image reading operation of the present embodiment.

Also in the present embodiment, all the R, G and B LEDs are simultaneously turned on in the reading time of the black-and-white image of a line as in the second embodiment, and the black-and-white image is reproduced from the output signals of the plural line sensors.

At first, prior to the actual image reading operation, the R, G and B LEDs are respectively turned on in the same manner as in the color image reading mode, and the respective turn-on periods $t^{ron20}$, $t^{gon20}$, $t_{bon20}$ are so determined as to obtain a predetermined output level from the sensor upon irradiation of the standard white board. Since three LEDs are simultaneously turned on in the black-and-white image reading mode, the sensor output level, obtained by irradiating the standard white board with each of the R, G and B LEDs is selected equal to ⅓ of the output level in the color image reading mode, so that there stand relationships $t^{ron20}=t^{ron19}/3$, $t^{gon20}=t^{gon19}/3$ and $t_{bon20}=t_{bon19}/3$.

Then, in a step S41 in FIG. 25, all the LEDs of three kinds of R, G and B colors are turned on, and the sensor array is activated by the start pulse SP and the clock pulse CLK, whereby W signals corresponding to the black-and-white image are accumulated in the pixels of the sensor array. The R, G and B LEDs are respectively turned off, after the lapse of respective turn-on periods $t^{ron20}$, $t^{gon20}$, $t_{bon20}$ determined by reading the standard white board as explained above. The W signal accumulation time $t^{W20}$ is determined corresponding to the case of color image reading with the darkest LED chips, where $t^{W20}=t^{ron19}=t^{gon19}=t_{bon19}$.

None of the R, G and B LEDs is turned on until the lapse of the above-mentioned period $t_{w20}$ After the lapse of the W signal accumulation time $t_{w20}$, the image sensor unit 201 is moved to a next reading line, whereupon all the R, G and B LEDs are turned on. Also the start pulse SP is entered whereby, in a step S6, the W signals of the preceding reading line accumulated in the pixels of the sensor array are simultaneously transferred to the analog memories of the sensor array and are then output to the exterior in succession, pixel by pixel. In this state, at the same time, the W signals of the next reading line are accumulated in the pixels of the sensor array.

The color image reading over the entire original image, based on the LED chips showing certain distribution in the light intensity, can be achieved by executing the above-explained process while moving the image sensor unit 201 line by line in the sub scanning direction. Also such control provides the advantages similar to those in the foregoing embodiments.

Figure 26:
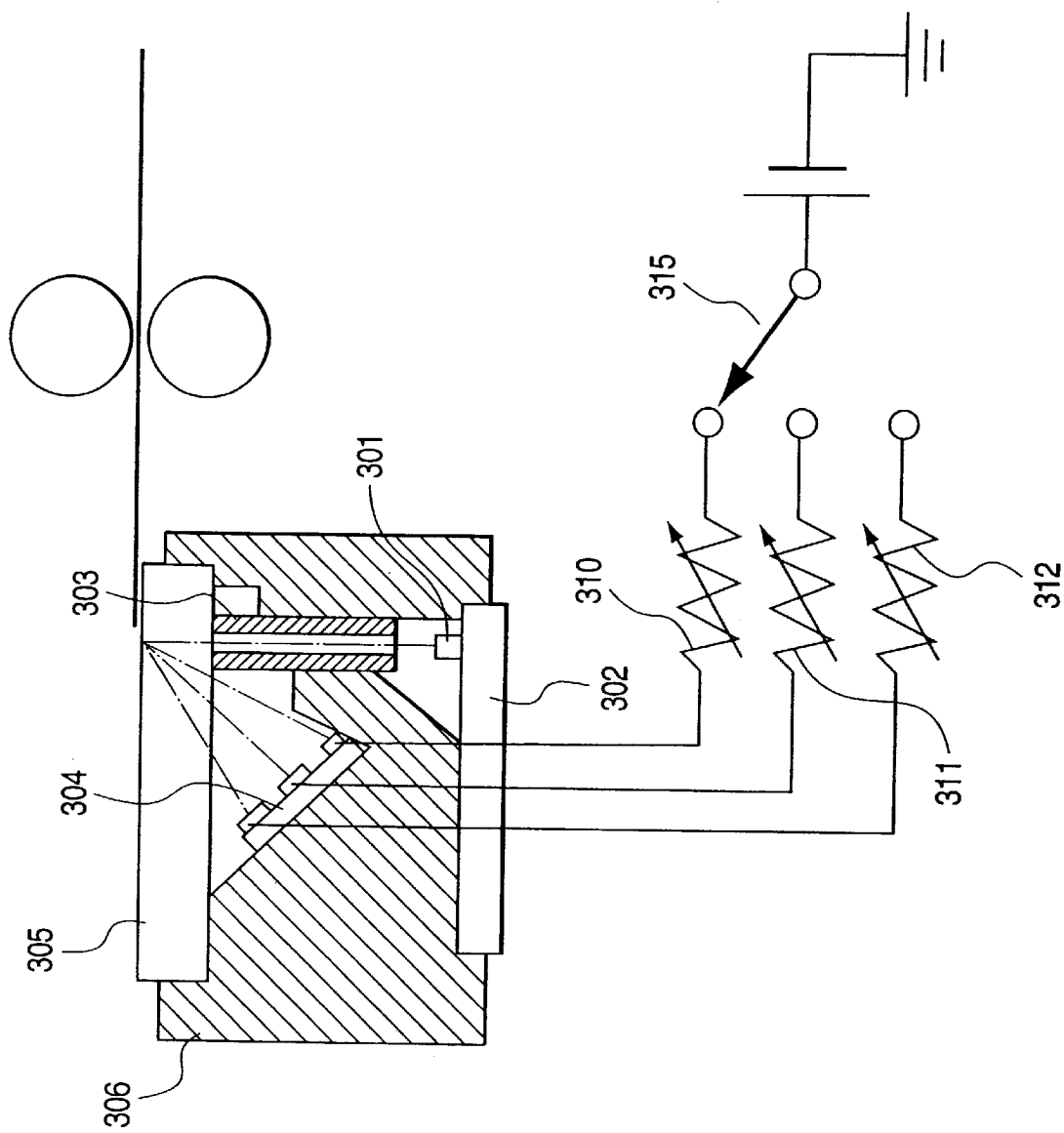
FIG. 26 is a cross sectional view of an image sensor in a fifth embodiment.

The image sensor of a fifth embodiment is composed, as shown in FIG. 26, of a sensor array in which a plurality of sensor ICs 301, each containing an array of photoelectric converting elements, are linearly arranged according to the size of the original image to be read, on a sensor substrate 302 consisting for example of glass fiber-reinforced epoxy resin, a lens array 303, an illuminating device 304, a cover glass 305 consisting of a translucent member for supporting the original image, and a frame member 306 consisting of a metal such as aluminum or a resinous material such as polycarbonate resin, for supporting and positioning the above-mentioned components.

The illuminating device 304 illuminates, from a diagonal direction, the color original supported by the cover glass 305 with lights of R, G and B colors in switched manner, whereby the optical information of the original image in three R, G and B colors are focused by the lens array 303 onto the sensor ICs 301 and converted therein into electrical signals which are then processed in the system to reproduce the original color image.

In case such color image sensor is used for reading a black-and-white image instead of the color image, there is required a long reading time since the image still has to be handled by the three-color signals of R, G and B, and there may also be generated errors resulting from errors in image reading. Particularly in case of reading a black-and-white original which is present between color originals, the operation becomes wasted because such black-and-white original is read also as a color original.

Figure 27:
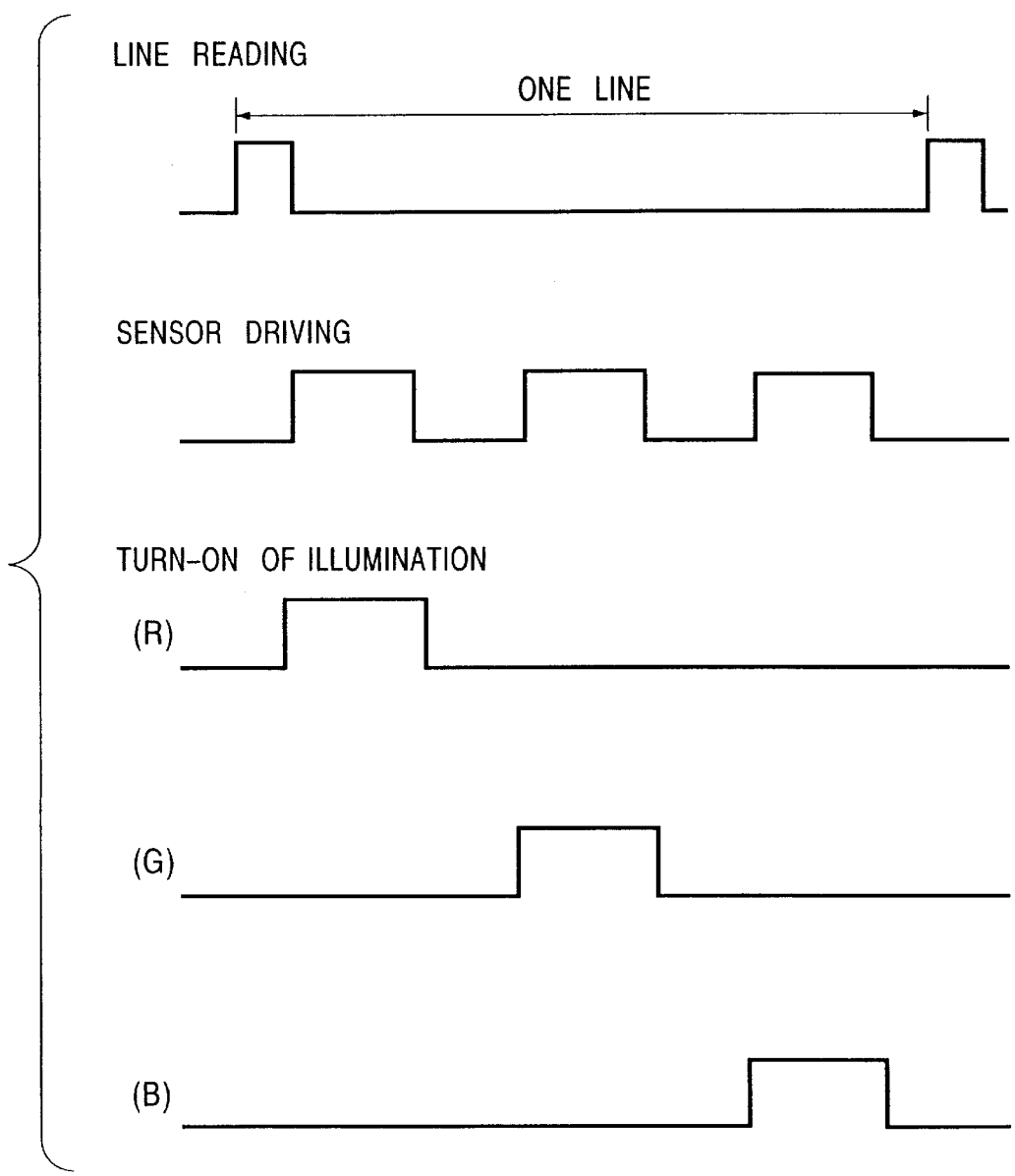
FIG. 27 is a timing chart of the color image reading.
Figure 28:
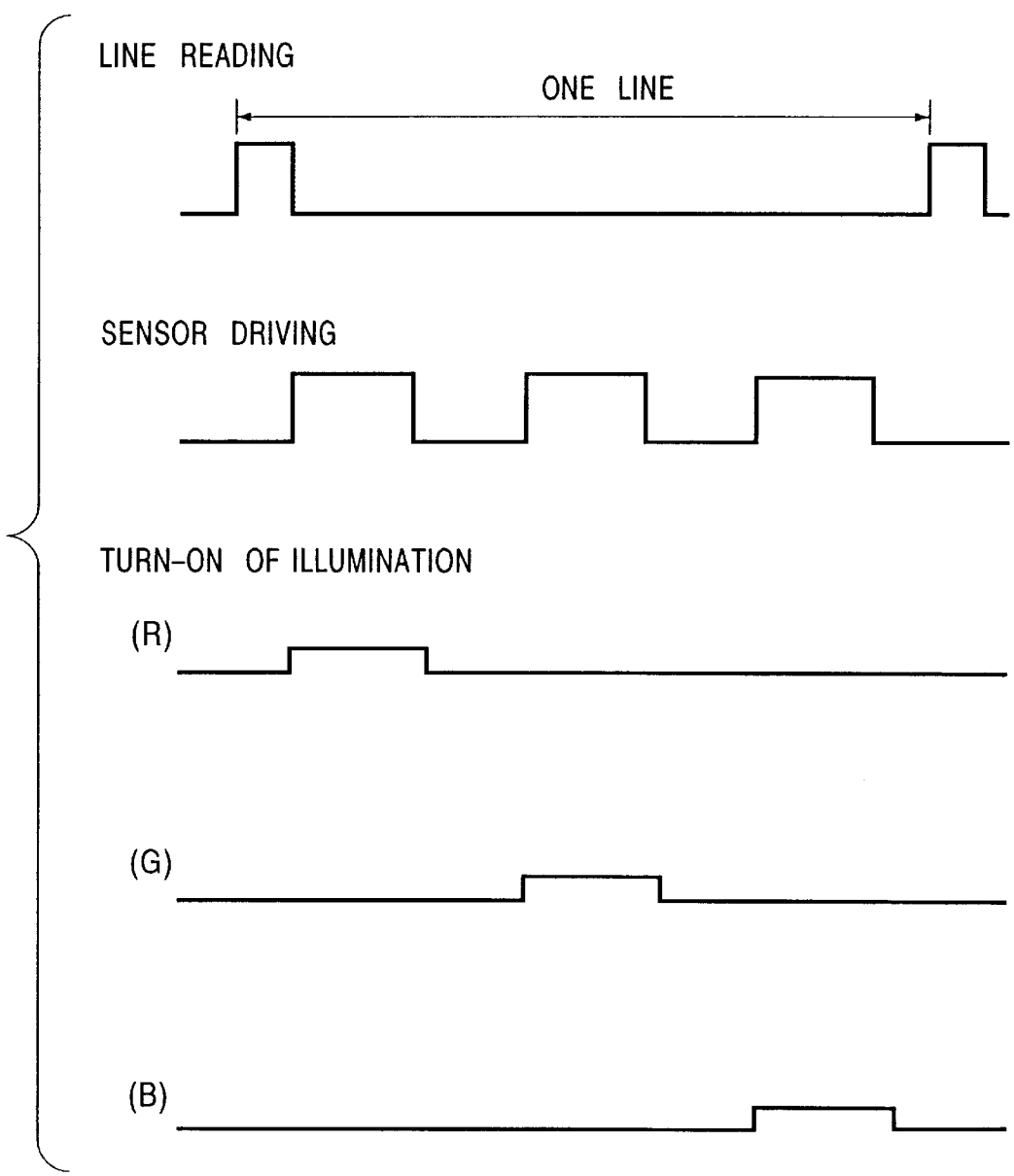
FIG. 28 is a timing chart of the fifth embodiment.

In the present embodiment, therefore, in case of reading a black-and-white image instead of the color image, the image reading speed is not altered but the luminances of the R, G and B colors for each reading line are adjusted by the control of the power supplies to the light sources, thereby preventing deterioration of the light sources in the luminances thereof. FIGS. 27 and 28 are timing charts of the present embodiment, respectively in the color reading mode and in the monochromatic reading mode.

More specifically, as shown in FIG. 26, the power supply for the light source of R, G and B colors is provided with luminance-limiting variable resisters 310, 311, 312, and the illuminating light sources are switched in succession by a switch 315. In case of reading the black-and-white image present between the color images, these variable resistors are shifted to higher resistances to limit the luminances of the light sources, thereby preventing the lowering in the illumination intensities resulting from the deterioration of the light sources and thus extending the service life of the image sensor. It is also rendered possible to improve the quality and reliability of the entire device, without requiring a change in the balance of the colors of the illuminating device in the change-over from the black-and-white original to the color original.

Figure 29:
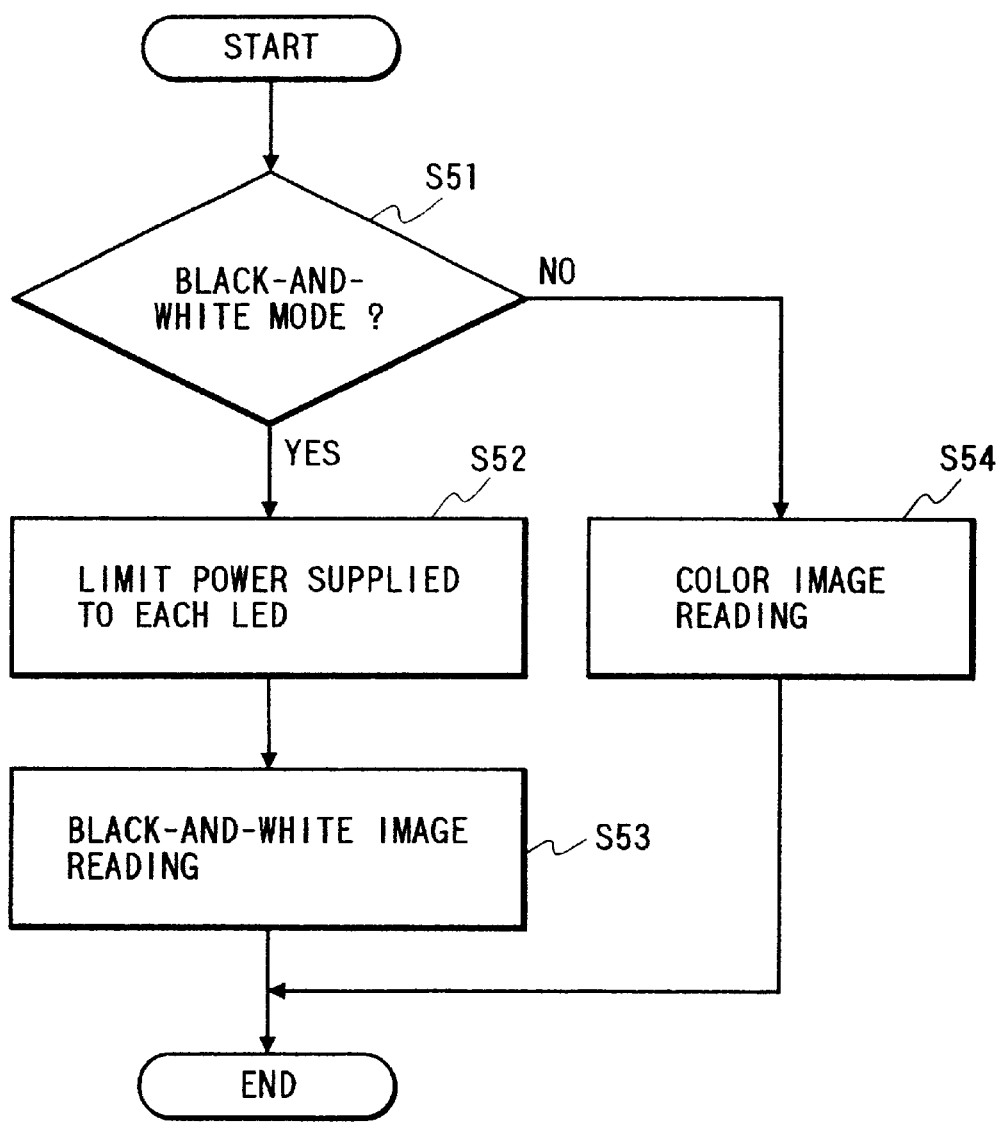
FIG. 29 is a flow chart showing the image reading operation in the fifth embodiment.

FIG. 29 is a flow chart showing the light source control operation of the present embodiment. In case a step S51 identifies the black-and-white reading mode, the sequence proceeds to a step S52 to increase the resistances of the variable resistors 310, 311, 312 thereby limiting the electric powers supplied to the LEDs. The resistances of the variable resistors may be independently selected, and it is not essential to increase the resistances of all the variable resistors. Then a step S53 executes the black-and-white image reading operation, and the sequence is terminated.

In case the step S51 identifies the color reading mode, a step S54 executes the color image reading operation, and the sequence is terminated.

Now there will be explained a sixth embodiment of the present invention, with reference to FIGS. 30, 31 and 32. The timing chart in the color reading mode is same as that shown in FIG. 27.

In the present embodiment, in case of reading a black-and-white original with the color image sensor, the image reading is executed with a speed higher than in the color image reading to reduce the illuminating time of the R, G and B color for each image reading line, thereby preventing the lowering in luminance resulting from the deterioration of the light sources.

Figure 30:
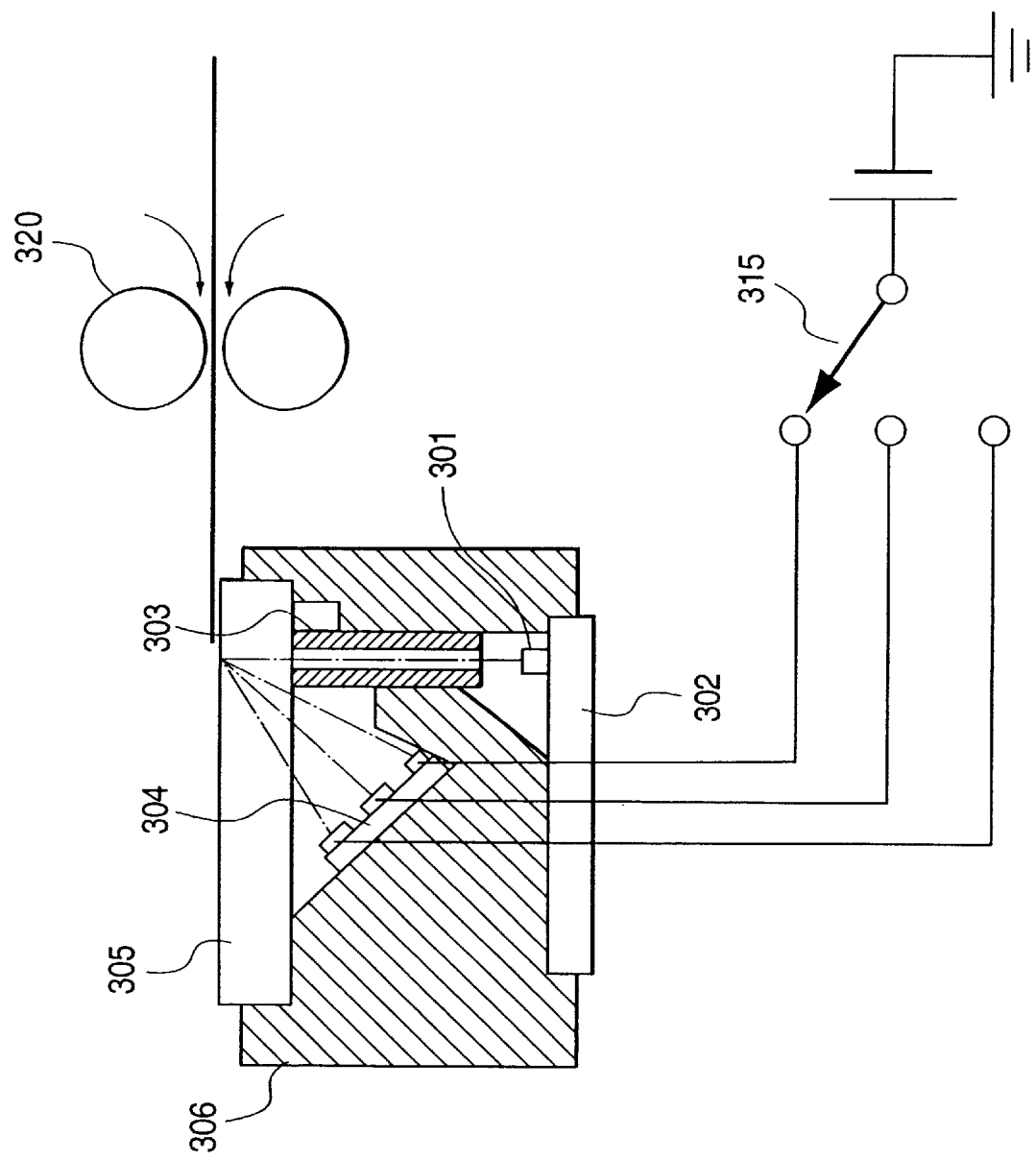
FIG. 30 is an across sectional view showing an image sensor constituting a sixth embodiment.
Figure 31:
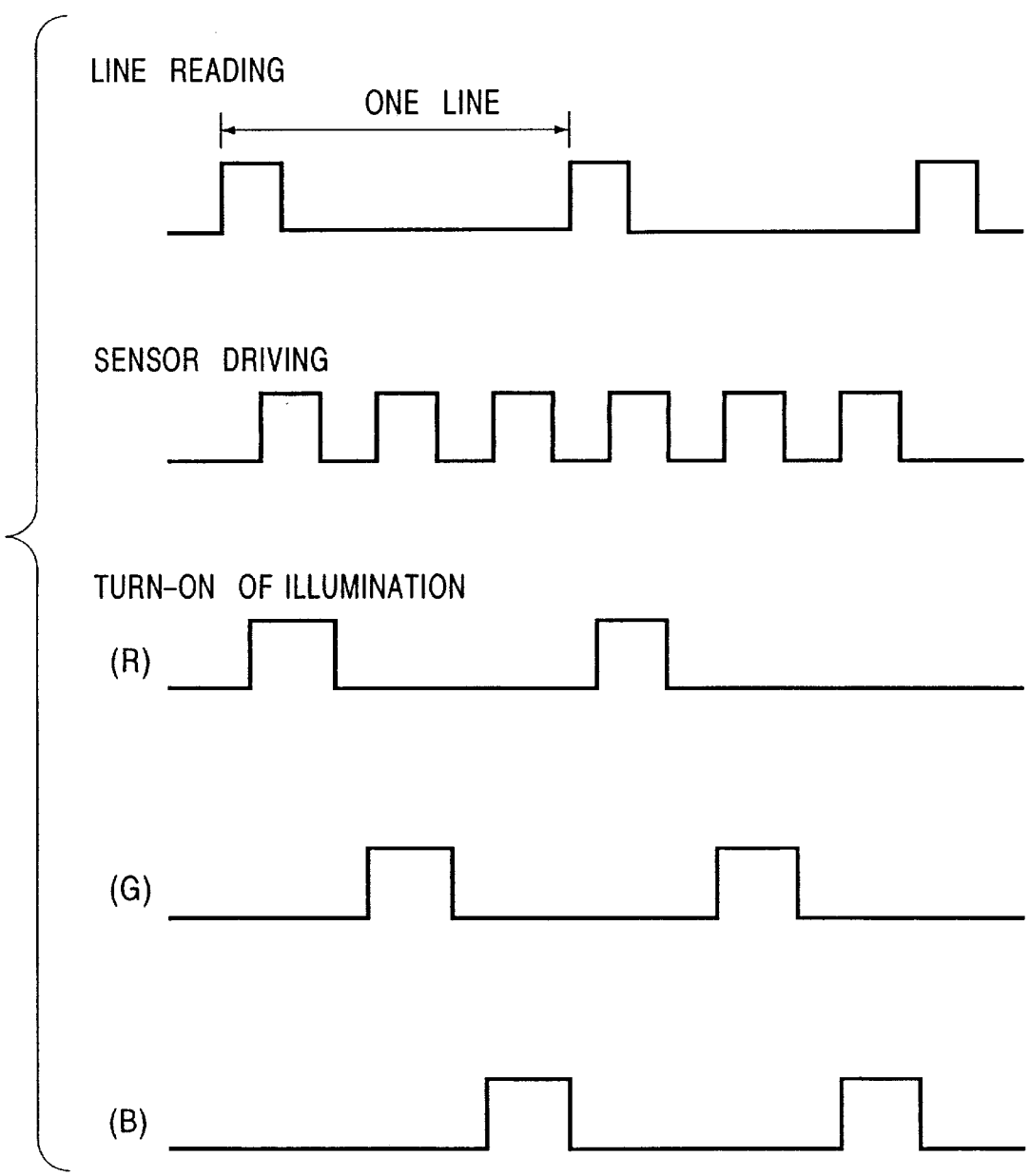
FIG. 31 is a timing chart of the sixth embodiment.

Referring to FIG. 30, a roller 320 for transporting the original is rotated at a speed which is three times of that at the color image reading mode, and the driving frequency of the sensor is also tripled. In case of reading the black-and-white original present between the color originals, the original image is illuminated by switching the light source of R, G and B colors in succession, and the electrical signals obtained by the sensor ICs are processed for the black-and-white image reading, whereby the turn-on period of the light sources is reduced for example to ⅓ of that in the color image reading mode, thereby preventing the lowering in the illumination intensity resulting from the deterioration of the light sources and extending the service life of the image sensor. It is also rendered possible to improve the quality and the reliability of the entire device, without requiring a change in the color balance of the illuminating device between the black-and-white image reading and the color image reading. FIG. 31 is a timing chart of the present embodiment.

Figure 32:
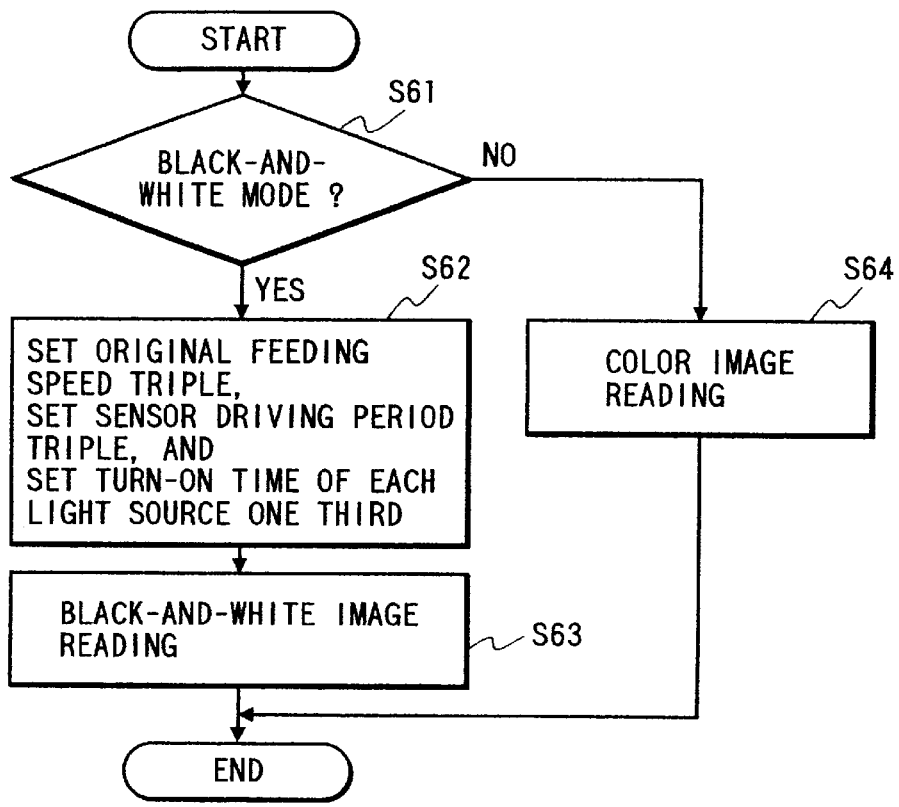
FIG. 32 is a flow chart showing the image reading operation in the sixth embodiment.

FIG. 32 is a flow chart showing the function of the present embodiment. In case a step S61 identifies the black-and-white reading mode, the sequence proceeds to a step S62 to triple the transport speed of the original and the driving frequency of the sensor and to reduce the turn-on period of each light source to ⅓. Then a step S63 executes the black-and-white image reading operation and the sequence is terminated. On the other hand, if the color image reading mode is identified, a step S64 executes the color image reading operation.

Now there will be explained a seventh embodiment of the present invention, with reference to FIGS. 33 and 34.

In the present embodiment, in case of reading a black-and-white original with the color image sensor, the speed of the original transporting roller 320 is tripled in comparison with the case of color image reading, but the driving frequency of the sensor is not changed. For each reading line, all the R, G and B light sources are not turned on but the original image is illuminated with the light source of one or two colors. In this manner the total turn-on time of each light source is reduced to prevent the deterioration in the luminance of the light sources.

Also the turned-on light source or sources are switched in succession for every reading line to prevent the difference in the deterioration of the luminance of the light sources of three colors.

Figure 33:
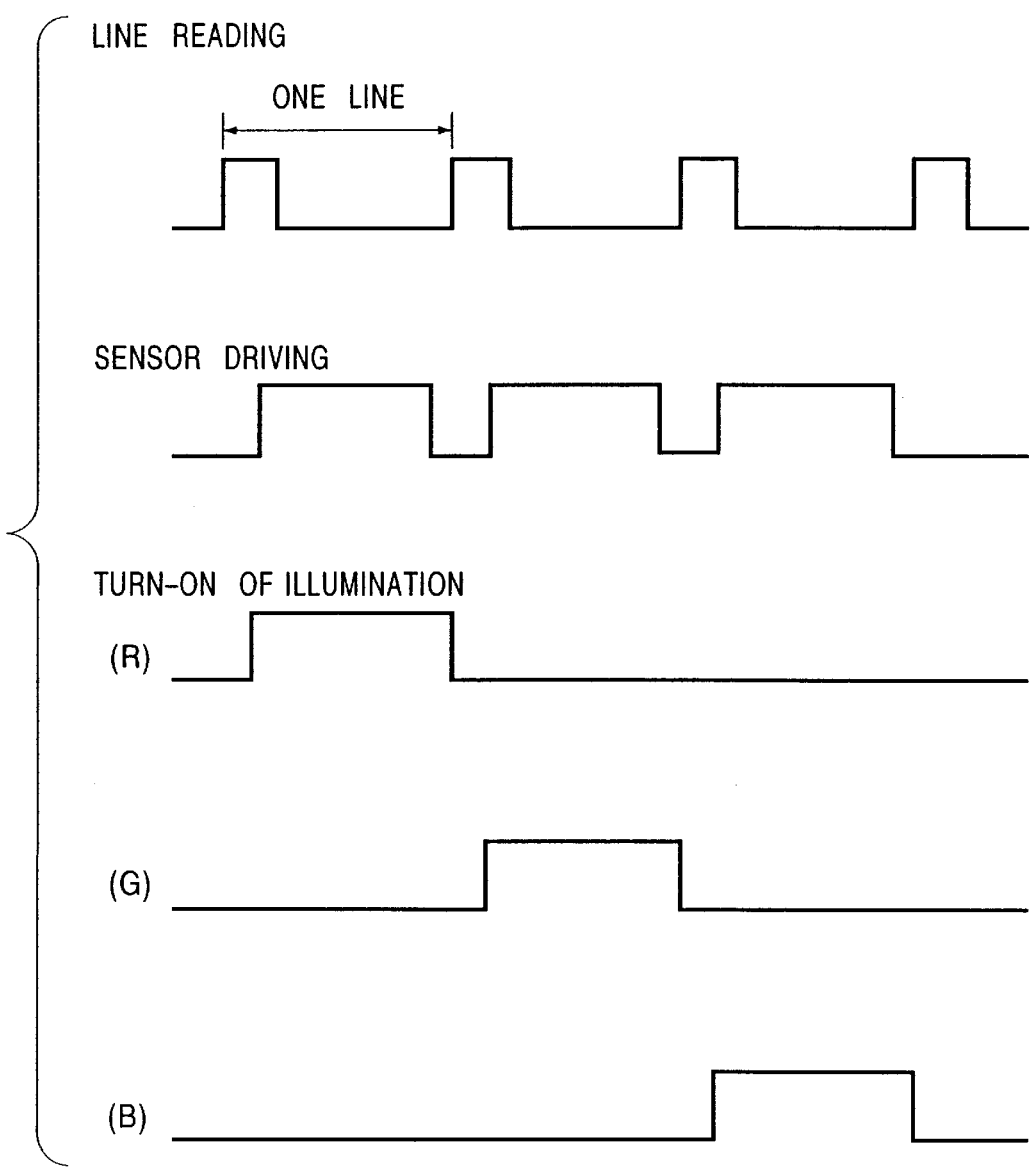
FIG. 33 is a timing chart of a seventh embodiment.

FIG. 33 shows an example of switching the R, G and B light sources in succession for every reading line and effecting the correction on the photoelectrically converted signal obtained from every reading line. In case of reading the black-and-white original present between the color originals, the control is switched in this manner to prevent the lowering in the illumination intensity resulting from the deterioration of the light sources and to extend the service life of the image sensor. It is also rendered possible to improve the quality and the reliability of the entire device, without requiring a change in the color balance of the illuminating device at the shift from the black-and-white image to the color image.

Figure 34:
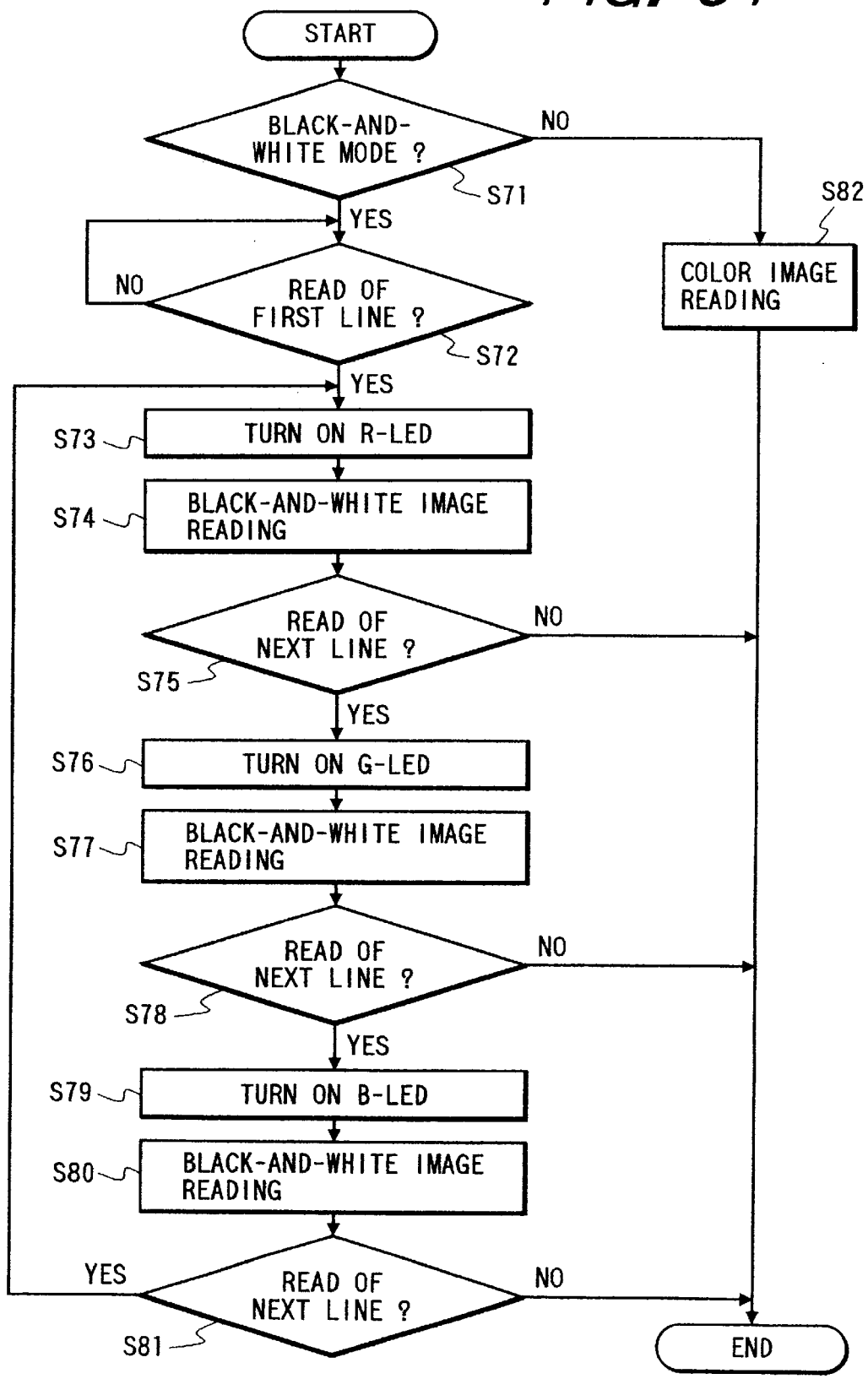
FIG. 34 is a flow chart showing the image reading operation in the seventh embodiment.

FIG. 34 is a flow chart showing the function of the present embodiment. In case a step S71 identifies the black-and-white reading mode, the sequence proceeds to a step S72. In case of reading the first line, a step S73 turns on the R LED and a next step S74 executes the image reading. In case a step S75 identifies the reading of a next line, a step S76 turns on the G LED and a step S77 executes the image reading. In case a step S78 identifies the reading of a further next line, a step S79 turns on the B LED and a step S80 executes the image reading. In the present embodiment, the turned-on light source is switched in succession for every reading line, in the order of R, G and B, but the switching order is not limited to the example mentioned above. It is also possible to turn on two light sources for every reading line and to switch the combination of the light sources for every reading line.

In case of reading the black-and-white original with the light source-switched color image sensor, the foregoing first to fourth embodiments maintain the same turn-on duty ratio of the light-emitting elements as in the color original reading operation, and turn on the light emitting elements at the same time or in succession while reducing the turn-on time of each light emitting element to ⅓, so that the forward current of each light emitting element can be maintained same both in the color image reading and in the black-and-white image reading and the forward current adjusting means for responding to the different reading modes can be dispensed with.

Also the signal accumulation time or the sensor output time for a line in the black-and-white image reading can be made same as that in the color image reading, so that the signal processing circuit need not be added or provided with adjusting means for the black-and-white image reading. Also the number of component parts of the entire device can be significantly reduced by constituting the illuminating device with such light sources such as three LEDs of R, G and B colors and employing such illuminating device as the light source for the light source-switched color image sensor.

Also in such light source-switched color image sensor, in case of switching from the color image reading to the black-and-white image reading, the fifth to seventh embodiments turn on the light sources, such as LEDs of R, G and B colors, with reduced luminances, or effect the image reading at a higher speed while maintaining the light sources at luminances same as those at the color image reading, or turn on such light sources in time-shared basis for each reading line, in order to reduce the turn-on time of the light sources at the black-and-white image reading, thereby preventing the lowering in the illumination intensity resulting from the deterioration of the light sources and extending the service life of the image sensor. Also the quality and the reliability of the entire device can be improved since the balance of the colors of the illuminating device need not be varied at the shift from the black-and-white image reading to the color image reading.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
    a plurality of light sources of mutually different light emission wavelengths;
    a photoelectric conversion unit which photoelectrically converts an image of an object illuminated by said plurality of light sources;
    a switching unit which switches between a first mode and a second mode;
    a read-out control unit which controls read out of a signal accumulated by said photoelectric conversion unit in a first line period in the first mode and the second mode; and
    a turn-on control unit which supplies a turn-on control signal to said plurality of light sources so that, in the first mode and the second mode, said plurality of light sources are turned on in a predetermined order in the first line period,
    wherein a duty ratio of the turn-on control signal is not changed, and wherein a turn-on time of each of said plurality of light sources is shorter in the second mode than the first mode.

2. An apparatus according to claim 1, wherein said turn-on control unit turns on said plurality of light sources in a same order in the first mode and the second mode.

3. An apparatus according to claim 1, further comprising a determination unit which turns on said plurality of light sources in the predetermined order, to illuminate a white reference before reading of an original in the second mode, and then determining a turn-on time for each of said plurality of light sources to be turned on in the first line period in the second mode, according to an output signal of said photoelectric conversion unit.

4. An apparatus according to claim 3, wherein said turn-on control unit controls turn-on of said plurality of light sources with a turn-on current having a same current amount per said plurality of light sources in the first mode and the second mode.

5. An apparatus according to claim 1, wherein said read-out control unit uses a same clock pulse in the first mode and the second mode to sequentially read out the signal of at least one pixel from said photoelectric conversion unit in the first line period.

6. An image reading apparatus comprising: first, second and third light sources of mutually different brightness;
    a photoelectric conversion unit which photoelectrically converts an image of an object illuminated by said light sources;
    a switching unit which switches between a first mode and a second mode;

a turn-on control unit which turns on said first, second and third light sources in a predetermined order in the first mode and the second mode; and a controller which effects control so that in the first mode, a signal accumulated under turn-on of the first light source is read out in a first line period, a signal accumulated under turn-on of the second light source is reed out in a second line period, and a signal accumulated under turn-on of the third source is read out in a third line period, and in the second mode, a signal accumulated throughout turn-on of said first, second and third light sources is read out in a fourth line period, wherein the first, second, third and fourth line periods are the same and correspond to a turn-on time of a said light source having the lowest brightness in the first mode.

7. An apparatus according to claim 6, wherein said controller uses an output clock pulse in the first mode and the second mode to sequentially read out the signal from at least one pixel of said photoelectric conversion unit in the first, second, third and fourth line periods.

8. An apparatus according to claim 6, wherein said turn-on control unit turns on said first, second and third light sources in a same order in both the first mode and the second mode.

9. An apparatus according to claim 6, further comprising:
a determination unit which turns on said first, second and third light sources to illuminate a white reference before reading an original in the second mode, and then determining a turn-on time for each of said first, second and third light sources to be turned on in the first line period in the second mode, according to an output signal of said photoelectric conversion unit.

10. An apparatus according to claim 6, wherein said turn-on control unit effects control so that said first, second and third light sources are turned on with a same ratio among turn-on times of said first, second and third light sources in the first mode and second mode.

11. An apparatus according to claim 6, wherein said turn-on control unit effects control of said first, second and third light sources with a same turn-on duty ratio in the first mode and the second mode.

12. An apparatus according to claim 11, wherein said turn-on control unit controls turn-on of said first, second and third light sources with a turn-on current having a same current amount for said first, second and third light sources in the first mode and the second mode.

13. A control method of an image reading apparatus comprising a plurality of light sources of mutually different light emission wavelengths, and photoelectric conversion means for photoelectrically converting an image of an object illuminated by the plurality of light sources, said control method comprising:

a switching step of switching between a first mode and a second mode;

a read-out control step of reading out a signal accumulated by the photoelectric conversion means in a first line period in the first mode and the second mode; and a turn-on control step of supplying a turn-on control signal to the plurality of light sources so that in the first mode and the second mode, the plurality of light sources are turned on in a predetermined order in the first line period, wherein a duty ratio of the turn-on control signal is not changed when the first mode and the second mode are switched from one to the other, and a turn-on time of each of the plurality of light sources is shorter in the second mode at a same ratio than in the first mode.

14. A method according to claim 13, wherein said turn-on control step turns on the plurality of light sources in a same order in both the first and second mode.

15. A method according to claim 13, further comprising a determination step of turning on the plurality of light sources to illuminate a white reference before reading of an original in the second mode, and then determining a turn-on time of each of the plurality of light sources to be turned on in the first line period in the second mode, according to an output signal of the photoelectric conversion means.

16. An apparatus according to claim 15, wherein said turn-on control step controls turn-on of the plurality of light sources with a turn-on current having a same amount per the plurality of light sources in the first mode and the second mode.

17. An apparatus according to claim 13, wherein said read-out control step uses a same clock pulse in the first mode and the second mode to sequentially read out the signal of at least one pixel from the photoelectric conversion means in the first line period.

18. A control method of an image reading apparatus comprising first, second and third light sources of mutually different brightness, and photoelectric conversion means for photoelectrically converting an image of an object illuminated by the light sources, said control method comprising:

a switching step of switching between a first mode and a second mode;

a turn-on control step of turning on the first, second and third light sources in a predetermined order in the first mode and the second mode; and a control step of effecting control so that in the first mode, a signal accumulated under turn-on of the first light source is read out in a first line period, a signal accumulated under turn-on of the second light source is read out in a second line period, and a signal accumulated under turn-on of the third light source is read out in a third line period, and in the second mode, a signal accumulated under turn-on of the first, second and third light sources is read out in a fourth line period, wherein the first, second, third and fourth line periods are the same and correspond to a turn-on time of a light source of the light sources having the lowest brightness in the first mode.

19. A method according to claim 18, wherein said control step uses a same output clock pulse in the first mode and the second mode to sequentially read out the signal of at least one pixel from the photoelectric conversion means in the first, second, third and fourth line periods.

20. A method according to claim 18, wherein said turn-on control step turns on the first, second and third light sources in a same order in the first mode and the second mode.

21. A method according to claim 18, further comprising a determination step of turning on the first, second and third light sources to illuminate a white reference before reading of an original in the second mode, and then determining a turn-on time of each of the first, second and third light sources to be turned on in the first line period in the second mode, according to an output signal of the photoelectric conversion means.

22. A method according to claim 18, wherein said turn-on control step effects control so that the first, second and third light sources are turned on with a same ratio among turn-on times of the first, second and third light sources in the first mode and the second mode.

23. A method according to claim 18, wherein said turn-on control step effects control of the first, second and third light sources with a same turn-on duty ratio in the first mode and the second mode.

24. A method according to claim 23, wherein said turn-on control step controls turn-on of the first, second and third light sources with a same turn-on current whose amount per all of the first, second and third light sources in the first mode and the second mode.

25. A storage medium for computer-readably storing a program for executing a control method defined in claim 13 in an image reading apparatus.

26. A storage medium for computer-readably storing a program for executing a control method defined in claim 18 in an image reading apparatus.

* * * * *

UNITED STATES PATENT AND TRADEMARK OFFICE
CERTIFICATE OF CORRECTION

PATENT NO. : 6,631,219 B2
DATED : October 7, 2003
INVENTOR(S) : Akihiko Yushiya et al.

It is certified that error appears in the above-identified patent and that said Letters Patent is hereby corrected as shown below:

Column 6,
Line 30, "an across" should read -- a cross --.

Column 14,
Line 10, "$t^{ron20}$, $t^{gon20}$, $t^{bon20}$" should read -- $t_{ron20}$, $t_{gon20}$, $t_{bon20}$ --;
Line 45, "$t^{ron20}$, $t^{gon20}$," should read -- $t_{ron20}$, $t_{gon20}$, --;
Line 52, "$t^{ron20}$=" should read -- $t_{ron20}$= --;
Line 53, "$t^{ron19}/3$, $t^{gon20}=t^{gon19}/3$" should read -- $t_{ron19}/3$, $t_{gon20}=t_{gon19}/3$ --;
Line 60, "$t^{ron20}$, $t^{gon20}$," should read -- $t_{ron20}$, $t_{gon20}$, --; and
Line 64, "$t^{w20}=t^{ron19}=t^{gon19}$" should read -- $t_{w20}=t_{ron19}=t_{gon19}$ --.

Column 17,
Line 61, "such" should read -- such a --.

Column 18,
Line 26, "read out" should read -- read-out --.

Signed and Sealed this

Twenty-fourth Day of February, 2004

JON W. DUDAS
*Acting Director of the United States Patent and Trademark Office*